March 6, 1962  A. R. BUCHHOLZ ET AL  3,023,755
ELECTRICALLY CONTROLLED COIN DISPENSING MACHINE
Filed Feb. 9, 1960  9 Sheets-Sheet 1

INVENTORS.
ARNOLD R. BUCHHOLZ
THOMAS A. EVANS
BY
*Arnold J. Evans*
ATTORNEY.

March 6, 1962 A. R. BUCHHOLZ ET AL 3,023,755
ELECTRICALLY CONTROLLED COIN DISPENSING MACHINE
Filed Feb. 9, 1960 9 Sheets-Sheet 2

INVENTORS.
ARNOLD R. BUCHHOLZ
THOMAS A. EVANS
BY
ATTORNEY.

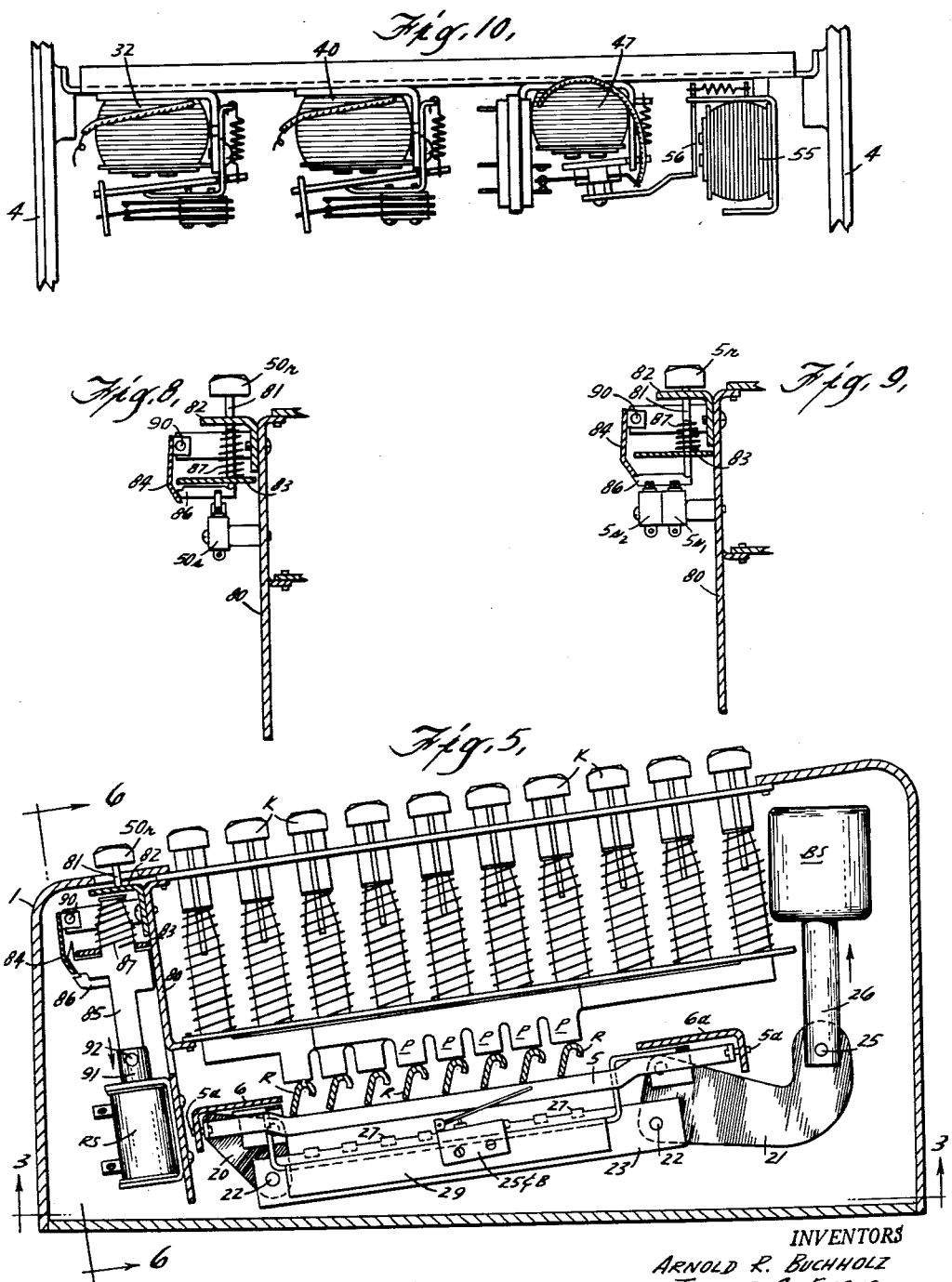

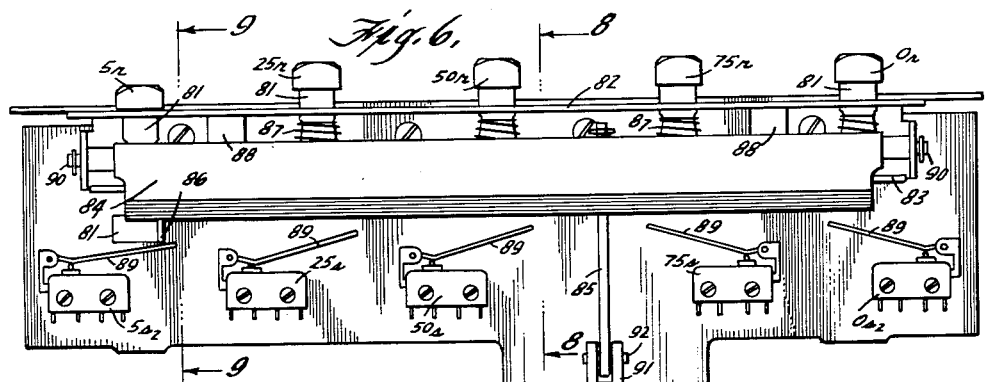
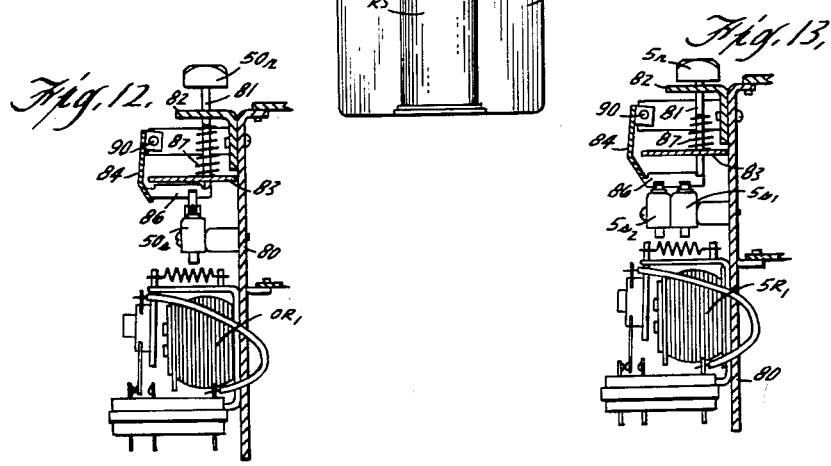
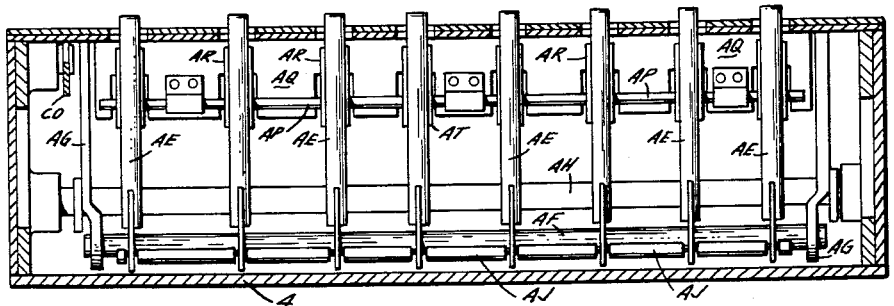

March 6, 1962  A. R. BUCHHOLZ ET AL  3,023,755
ELECTRICALLY CONTROLLED COIN DISPENSING MACHINE
Filed Feb. 9, 1960  9 Sheets-Sheet 5

Fig. 20,

INVENTORS,
ARNOLD R. BUCHHOLZ
THOMAS A. EVANS
BY
ATTORNEY,

March 6, 1962   A. R. BUCHHOLZ ET AL   3,023,755
ELECTRICALLY CONTROLLED COIN DISPENSING MACHINE
Filed Feb. 9, 1960   9 Sheets-Sheet 6

INVENTORS.
ARNOLD R. BUCHHOLZ
THOMAS A. EVANS
BY
Arnold J. Ericsen
ATTORNEY.

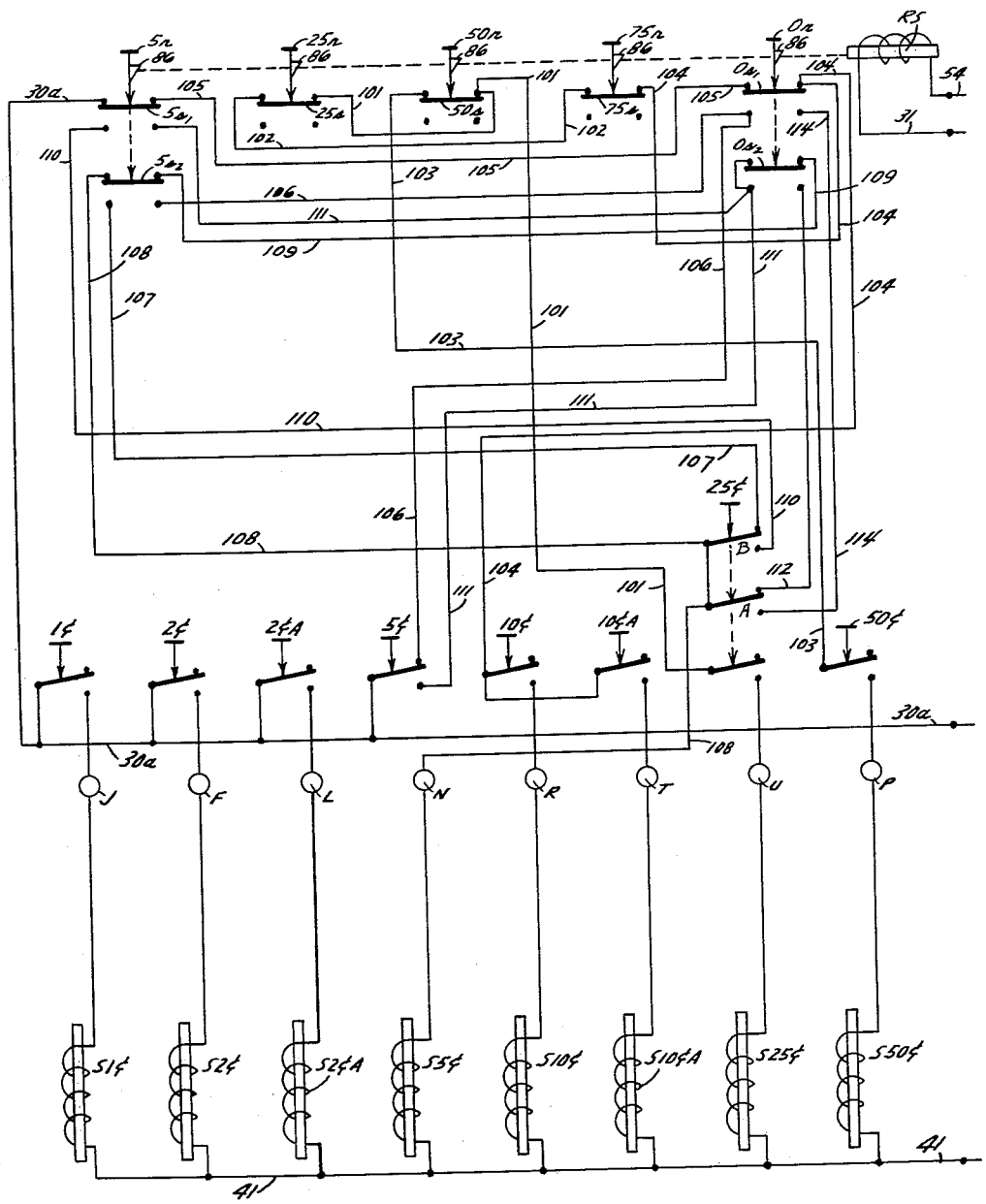

INVENTORS.
ARNOLD R. BUCHHOLZ
THOMAS A. EVANS
BY
Arnold J. Ericson
ATTORNEY.

INVENTORS
ARNOLD R. BUCHHOLZ
THOMAS A. EVANS
BY
Arnold J. Ericsen
ATTORNEY.

United States Patent Office 3,023,755
Patented Mar. 6, 1962

3,023,755
ELECTRICALLY CONTROLLED COIN DISPENSING MACHINE
Arnold R. Buchholz and Thomas A. Evans, Watertown, Wis., assignors to Brandt Automatic Cashier Company, Watertown, Wis., a corporation of Wisconsin
Filed Feb. 9, 1960, Ser. No. 7,648
8 Claims. (Cl. 133—4)

The present invention relates to coin dispensing machines and more particularly to electrically controlled machines.

It is an object of the present invention to provide an electrically operated coin changer machine which may be controlled from a remotely located full range keyboard having keys numbered from 1 through 99, and which machine further provides a "full range" changer for dispensing correct change from any tendered amount of money of one dollar or less, and ending in either "five" or "zero."

It is a particular object of the present invention to provide the addition of two range keys, or tender-basis-scheduling keys to a coin changer machine to enable the operator to use the machine to dispense change from any tender basis ending in five or zero and, from one nickel to and including one dollar, wherein the added range keys provide an improved operation to former electrically operated machines which were only capable of dispensing change from a tender basis of 25¢, 50¢, 75¢ and $1.00.

It is a further object of the present invention to provide a series of mechanically latched, button operated switches for a changer machine, and being arranged to provide the necessary electrical switching for electrically scheduling the dispensing of proper change from any tender ending in five or zero.

It is still another object of the present invention to provide an improved and simplified releasing means for the mechanical latching arrangement controlling the said buttons upon completion of a machine cycle.

It is a still further object of the present invention to provide an improved electrical means in combination with a clutch operated switch to assure "single-cycle" operation of the dispensing section of a coin dispensing machine, which may comprise either a payer or changer arrangement, and consequently to make certain that for each depression of a payment key, only one payment shall occur, since only one rotation of the dispensing unit drive shaft is permitted to take place.

It is yet another object of the present invention to provide an electrical interlock for an electric dispensing coin machine to assure that for each depression of a payment key, that only one energization of the prime mover means will occur for maintaining selected button operated rockers in place, to thereby provide further assurance that erroneous multiple payments shall not take place.

It is a specific object of the present invention to provide in one embodiment thereof the addition of tender-basis-scheduling keys to a dispensing coin changer arranged to operate a series of switches for electrically scheduling the dispensing of proper change from any tender ending in five or zero.

It is another specific object of the present invention to provide a further embodiment thereof in which the tender-basis-scheduling keys are arranged to control relay-operated switches for electrically controlling the dispensing of proper change for any tender ending in five or zero.

Reference is had to the copending application, Serial No. 721,743 for Electrically Controlled Coin Dispensing Machine, filed by Arnold R. Buchholz and Frank Haban on March 17, 1958, now Patent No. 2,988,092, issued June 13, 1961, and assigned to the same assignee as the present invention. In the copending application, there is disclosed an electrically controlled coin dispensing machine in which a "changer" embodiment thereof provides a full keyboard having keys numbered from 1 to 99, and which machine further includes tender-basis-scheduling buttons adapted to tender amounts of 25¢, 50¢ and 75¢, and which buttons actuate normally closed electrical switches to the open circuit position for rendering the operation of either or both the 25¢ and 50¢ dispensing channels ineffective to dispense coins. The machine of the present invention adopts certain of the principles set forth in that application, and further provides the addition of two tender or range keys which permit change to be dispensed for tenders under one dollar ending in either zero or five, and accomplishes this function by dispensing such change in the least number of coins required for the payment.

In addition, the present invention provides an improved electrical means in the form of a relay in place of a relatively complex mechanical means which operated in combination with an interlocked switch. The present construction utilizes the improved relay means in combination with a similar, but simplified, switch to provide positive acting means of assuring "single-cycle" operation of the dispensing unit, and consequently to make certain that for each depression of a payment key only one payment shall occur.

Further, the structure of the electrically controlled unit has been improved over and above that of the copending application structure in the provision of an electrical interlocking relay means in substitution for the former mechanical interlock, and which improved means assures that for each depression of the payment key only one energization of the solenoid operating the payment key rack-bar shall take place, thus providing further assurance that erroneous multiple payments shall not occur.

Preferred embodiments of the invention are illustrated in the accompanying drawings, in which:

FIG. 5 is a vertical sectional view taken through the key section of the keyboard along line 5—5 of FIG. 3, but not through the key assembly;

FIG. 6 is a vertical sectional view taken on the line 6—6 of FIG. 5;

FIG. 8 is a vertical sectional view taken through the key section of the keyboard along line 8—8 of FIGS. 1 and 6;

FIG. 9 is a vertical sectional view taken through the key section of the keyboard along line 9—9 of FIGS. 1 and 6;

FIG. 10 is a detailed vertical sectional view taken on the line 10—10 of FIG. 7;

FIGS. 12 and 13 are vertical sectional views of another embodiment of this invention taken in substantially the same plane as FIGS. 8 and 9, respectively, in the view of FIG. 6;

FIG. 16 is the left hand side of a circuit diagram for the changer keyboard;

FIG. 20 is a detailed horizontal sectional view taken on the line 20—20 of FIG. 11;

FIG. 21 is a detailed horizontal sectional view taken on the line 21—21 of FIG. 11.

The function of the keyboard features hereinafter described apply to a changer. The keys are numbered in terms of a purchase price less than a dollar, and in the configuration shown in FIG. 1. The keyboard is designed to function basically on a dollar tender basis; but since it is sometimes necessary to handle transactions involving tenders of less than a dollar, additional operations are necessary when operating on this basis that will be explained in connection with FIGS. 1, 3, 4, 5, 6, 8, 9, 16, 17 and 18.

The keyboard herein described is designed to control the selective positioning of motor operated coin ejector mechanisms so that the selected ejectors may then act to dispense the desired coins. Parts of the dispensing unit are shown in FIGS. 2, 7, 10, 11, 14–17, 18, 20 and 21.

Figure 2:
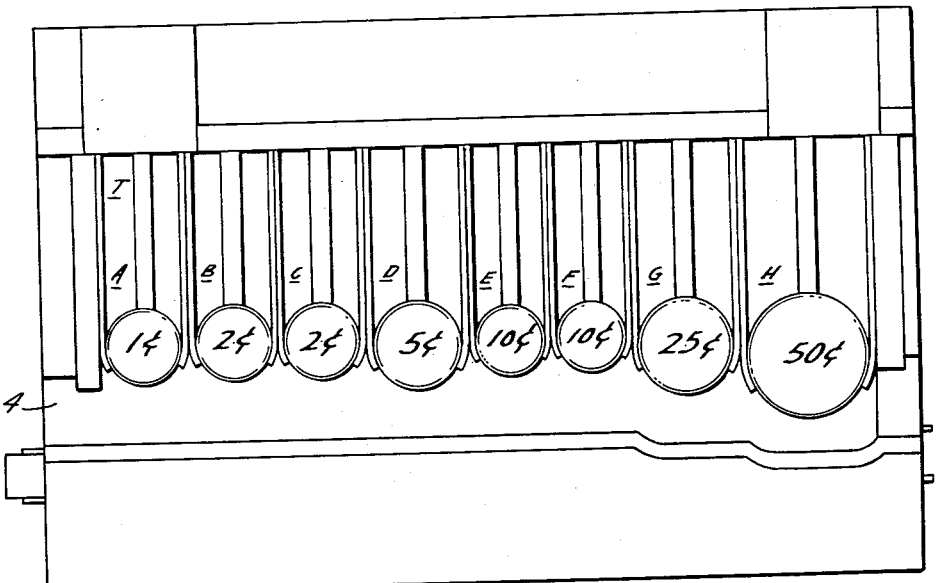
FIG. 2 is a plan view of the dispensing unit seen from above.
Figure 7:
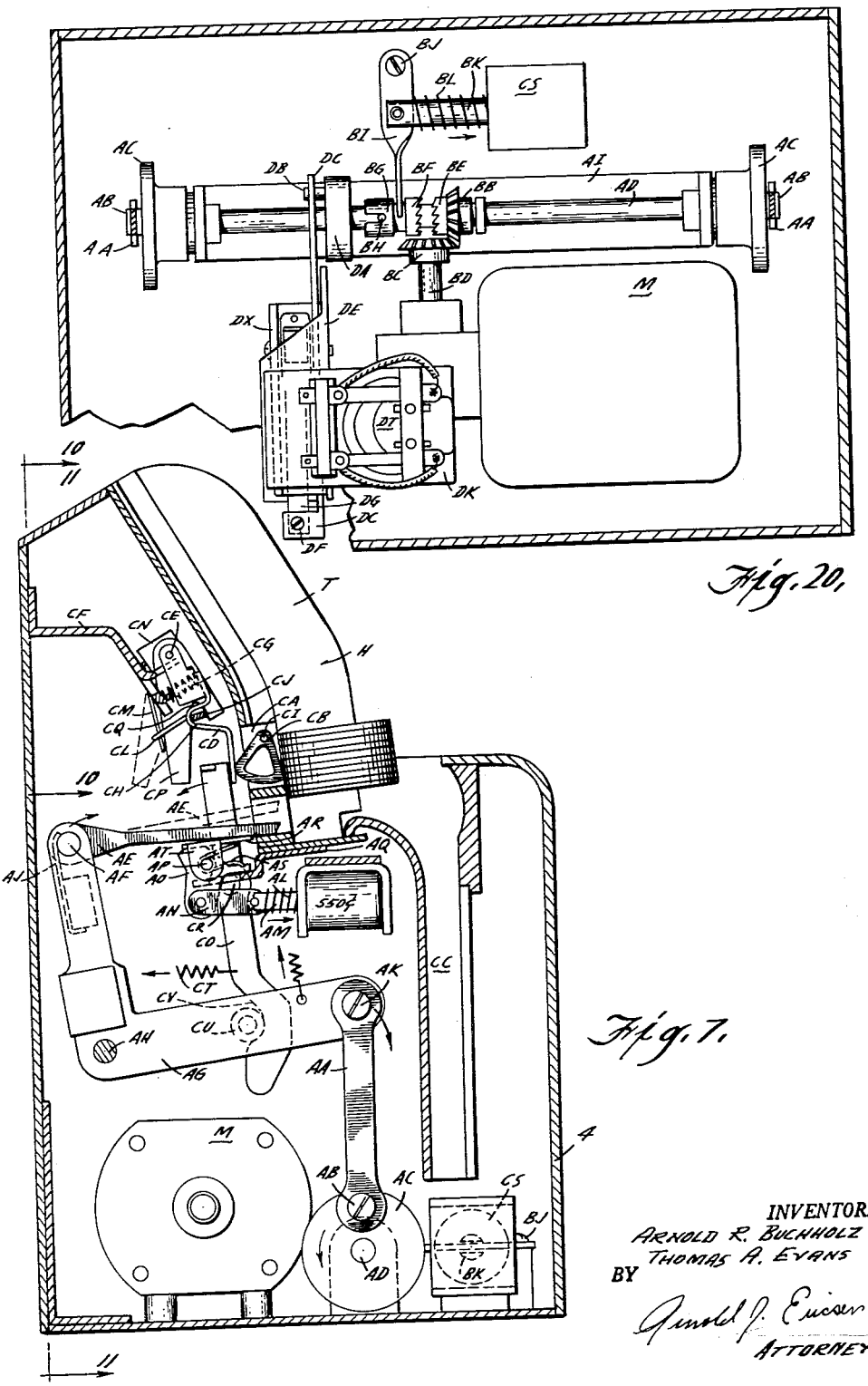
FIG. 7 is a vertical sectional view through a dispensing unit of a type that is controlled by a keyboard embodying the invention, taken on the broken line 7—7 of FIG. 11.
Figure 11:
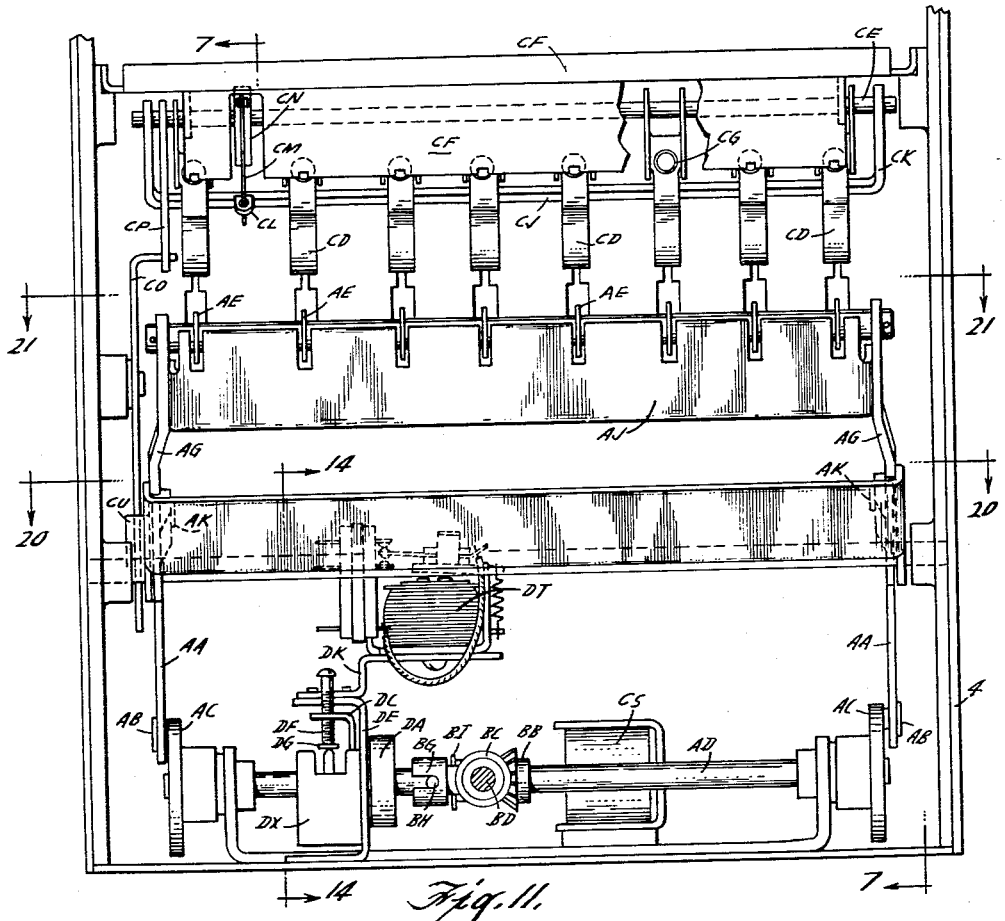
FIG. 11 is a vertical sectional view through the dispensing apparatus, taken on the line 11—11 of FIG. 7.
Figure 15:
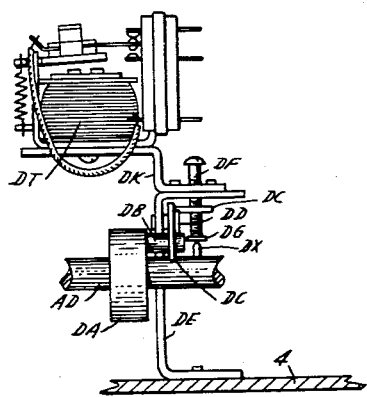
FIG. 15 is an end elevation looking along line 15—15 of FIG. 14.
Figure 14:
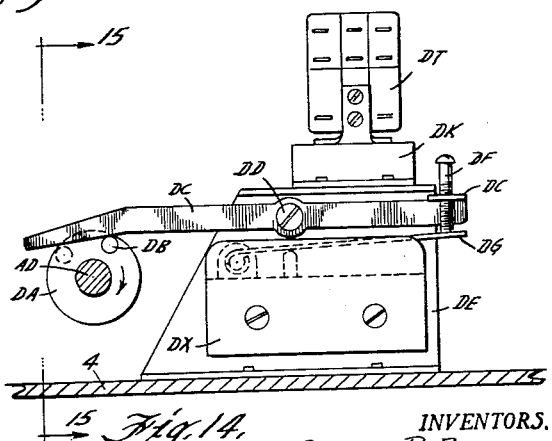
FIG. 14 is a detailed vertical sectional view taken on the line 14—14 of FIG. 11.

Referring to FIGS. 2, 7 and 11, the dispensing unit of both described embodiments, as well as that of the aforementioned copending application, S.N. 721,743, includes a housing 4 having a coin receiving tray T mounted thereon and provided with coin receiving channels A, B, C, D, E, F, G and H. One-cent coins, one at a time, are dispensed from channel A. Two one-cent coins, at a time, are dispensed from each of the two channels B and C. One nickel coin, at a time, is dispensed from channel D. One dime, at a time, is dispensed from each of the two channels E and F. One quarter coin, at a time, is dispensed from channel G. One half-dollar coin, at a time, is dispensed from channel H.

A coin ejector mechanism is associated with each of the above coin receiving channels, that for the channel H, as shown in FIG. 7, being selected as representative of any one of the channels. Each ejector mechanism includes a coin ejector finger AE working through a slot in the coin tray and pivotally mounted on a transversely disposed pivot-shaft AF carried at its ends in the upper arms of oppositely disposed bell crank levers AG that are pivotally mounted intermediate their ends on a transversely disposed pivot-shaft AH, said finger being normally urged downwardly by its own weight and guided in a slot of a spacer bar AJ on said lever AG (see also FIG. 21). The lower arm of each lever AG is pivotally connected by a pin AK to one end of a link AA. The other end of each link AA is pivotally connected to a crank pin AB on a crank disk AC mounted on a motor driven shaft AD.

Referring to FIGS. 11 and 20, the shaft AD carries a bevel gear BB meshing with a bevel gear BC on the output shaft BD of a reduction geared electric motor M, the hub of gear BB having a drive clutch face BE (see FIG. 20) adapted to mesh with a mating driven clutch face BF on a grooved collar BG slideably keyed to the shaft AD by a pin and slot connection BH and engaged by the forked end of a lever BI pivoted at BJ on the machine frame and pivotally connected intermediate its ends with the plunger BK of a solenoid CS, said collar and plunger being normally urged toward a clutch release position by a spring BL acting on lever BI. On energization of solenoid CS, the clutch faces BE and BF are engaged and the motor through the gears BB and BC rotates the shaft AD which through the cranks and links above described reciprocates the links AA and thereby oscillates the levers AG which in turn reciprocate the fingers AE.

To render any one of the fingers AE effective to dispense coins from its associated coin channel, each finger is raised to a coin-dispensing position by a solenoid-operated means which in FIG. 7 has been shown in detail in connection with the solenoid S50¢ whose plunger AL, normally urged to a return position by a spring AM, is operatively connected by a link AN with one arm of a lever AO suitably pivotally mounted on a pin AP on a shelf bracket AQ. A second lever AR, engaging the ejector finger AE, is also pivotally mounted on the pin AP, and a spring AS is interposed between these levers AO and AR so that the lever AR is swung upwardly by pressure exerted through spring AS when the lever AO is swung counterclockwise upon the energization of solenoid S50¢, and this acts to swing the ejector finger AE from its full-line to its dotted-line position, as shown in FIG. 7, so that on its forward stroke or movement toward the right it ejects a half dollar from the coin channel H.

Means are provided to prevent the operation of the machine in the event of a coin depletion in any one of the coin channels and then permit only one or more specially controlled operations before the depleted channel is replenished.

Referring to FIGS. 7 and 11, each coin channel has a slot CA, and a coin engaging lever on finger CB is pivotally mounted at its upper end CI to work in said slot. Each finger CB is yieldably held against the stack of coins in its associated channel by a lever CD pivotally mounted at its upper end on a transversely extending shaft CE carried by a shelf CF and urged against the finger by a spring CG. Each of the levers CD has a notch CH formed therein, and the transverse portion CJ of a U-shaped bar CK is seated in said notch, the legs of said bar being pivotally mounted on the shaft CE. The bar CJ carries an apertured bracket arm CL in which the outer end of an actuator CM for a normally open switch CN is mounted. When a coin depletion occurs in any one of the stacks, the finger CB of that stack is free to move outwardly into its associated coin channel, and its lever CD under the influence of its spring CG is swung toward the right as viewed in FIG. 7 to in turn swing the bar CK counterclockwise so that its arm CL presses on the actuator CM to close the switch CN and as hereinafter described the closing of this switch acts to open the motor circuit to stop further action of the machine. Further operations of the machine are permitted as hereinafter described by the operation of a "depletion release" key DR (in the keyboard, FIG. 1) prior to the depressing of a dispensing key. The key DR acts on the intermediate portion of a lever EA (see FIG. 3) pivoted on the machine at EB and adapted to engage the actuator EC or a depletion release switch DRS.

To permit the coins in the channels to feed down freely during each dispensing operation of the machine, pressures of the levers CD on the fingers is momentarily relieved by the engagement of a lever CO with a lever arm CP (see FIGS. 7 and 11) on the shaft CE which is notched at CQ to engage the bar portion CJ. The lever CO is operated in proper cyclic sequence with the levers AG, and for this purpose is pivotally mounted intermediate its ends on a pivot CR and has a cam notch CV held by a spring CT against a roller CU carried by one of the levers AG so that as this lever AG swings down, the upper bent end of lever CO engages the lever arm CP to swing it clockwise and with it the bar portion CJ and the levers CD engaged thereby to swing them away from their fingers CB to relieve the pressure on said fingers.

Referring to FIGS. 11, 14, 15 and 20, the shaft AD has the crank disk DA mounted thereon carrying a cam or crank pin DB which near the end of the turning movement of said shaft is adapted to engage one end of a lever DC pivotally mounted intermediate its ends on a pin DD carried by a bracket DE to swing the other screw DF carrying the end of said lever DC into engagement with the actuator DG of a switch DX to shift it to its other position to stop the motor as hereinafter described. Also mounted on bracket DE is another bracket DK on which in turn is mounted relay DT.

Figure 1:
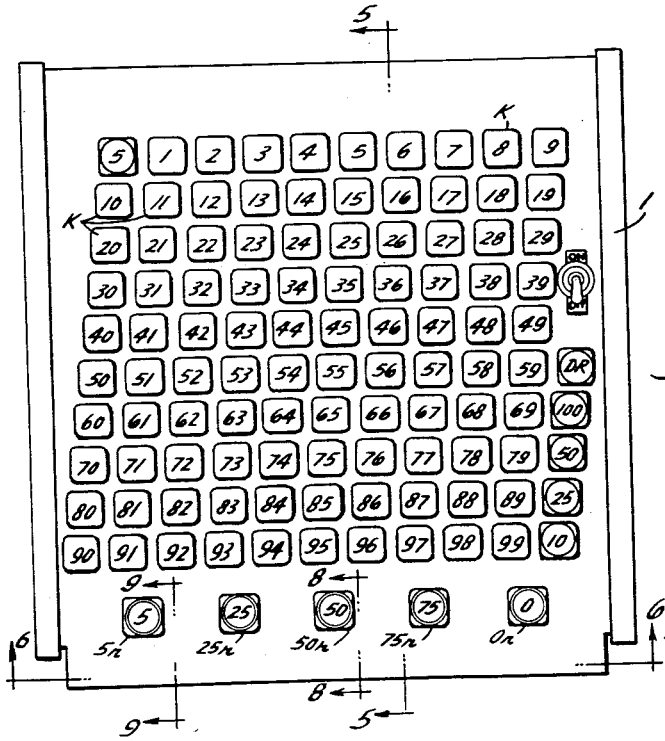
FIG. 1 is a plan view of the keyboard unit as seen from above.

Referring now to FIG. 1, the keys K of the keyboard are of known construction and are spring operated to a returned position, their details to be found in the following U.S. Patents: Brandt No. 1,850,198, dated March 22, 1932, and Brandt No. 1,822,560, dated September 8, 1921. The keys K are designed to provide one or more projections P, each of which is disposed over a rocker R (see FIG. 5).

Figures 3, 4:
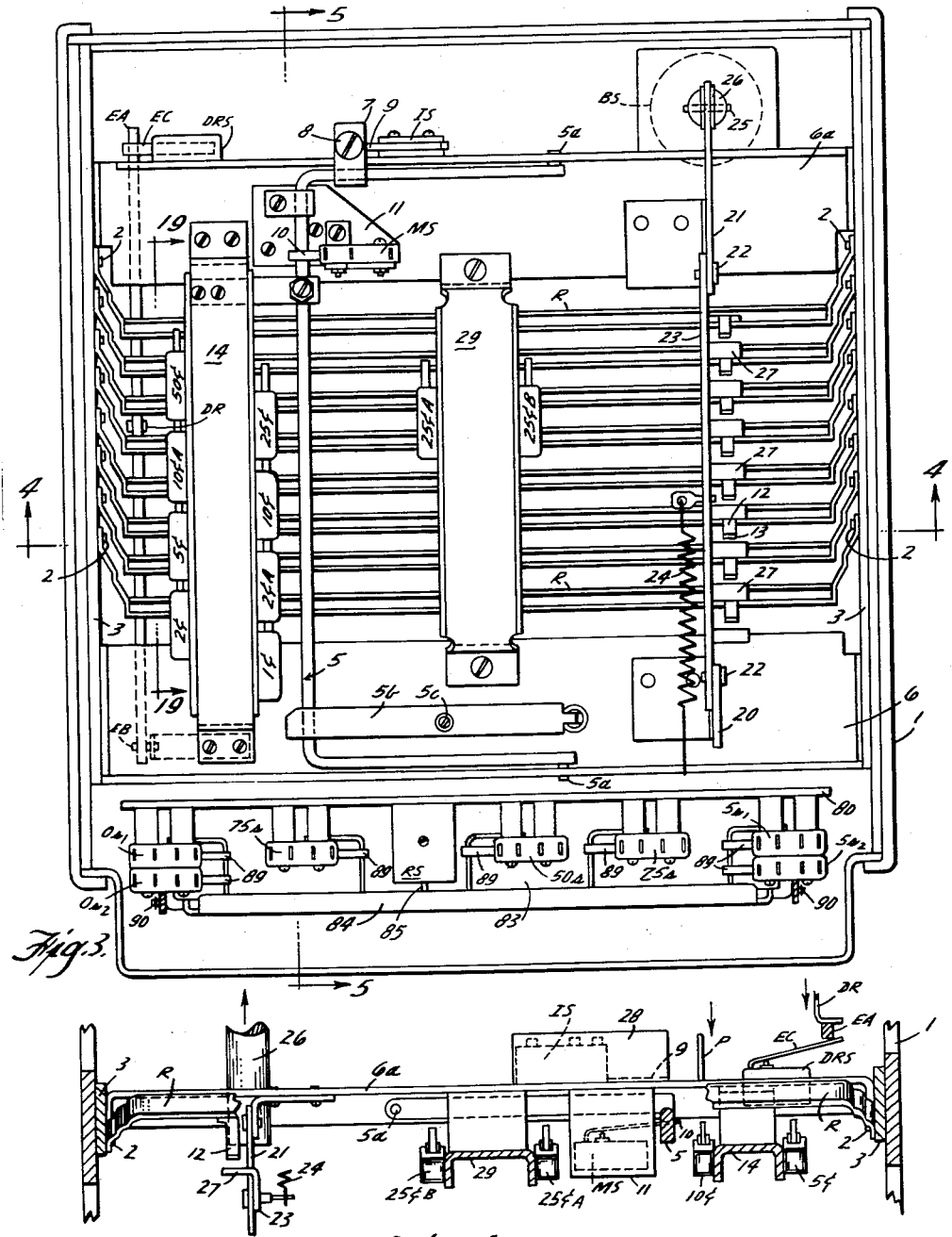
FIG. 3 is a plan view looking upward from the bottom of the apparatus.
FIG. 4 is a vertical sectional view taken on the line 4—4 of FIG. 3.

Referring to FIGS. 3, 4 and 5, each rocker R is pivotally mounted at its ends on the pins 2 mounted in the side-frame members 3 of the machine and held against the keys by a spring (not shown). When any one of the keys K is depressed, one or more of the rockers R will be operated depending upon the arrangement and quantity of the projections P provided for that particular key K (see also FIG. 5), these projections being designed to actuate those rockers which act to dispense the least number of coins required to properly pay out the amount of money scheduled to be paid.

Mounted in the path of movement of the rockers R is the transverse portion of a U-bar 5 (see FIGS. 3, 4), here termed an equalizing bar, whose legs are pivotally mounted on the frame of the machine at 5a in the support brackets 6 and 6a. The equalizing bar 5 carries mounted thereon a small bracket 7 into which is mounted an adjustable actuating pin 8 which may take the form of an adjustable machine screw, which in turn bears against the actuator 9 of the initiating switch IS so that the normally closed (N.C.) contact of the switch is caused to close as the actuating pin 8 moves away from the switch when at any time the bar 5 is caused to swing in a downward direction.

Referring to FIGS. 3 and 4, it will be apparent that that the bar 5 engages an actuator 10 of the motor switch MS mounted on bracket 11 which in turn is mounted on support bracket 6a. As is evident, the switch MS is arranged to be mounted in such a manner that the normally open (N.O.) contact of the switch is caused to close when at any time the bar 5 is caused to swing in a downward direction.

When any rocker R is depressed by a key (see FIG. 19), its indented end portion 15 is adapted to engage the switch actuator of a respective coin switch. The coin switches are designated 1¢, 2¢, 2¢A, 5¢, 10¢, 10¢A, 25¢ and 50¢ (see FIG. 16) and control respectively the solenoids S1¢, S2¢, S2¢A, S5¢, S10¢, S10¢A, S25¢, and S50¢. Some of these coin switches and their actuators are shown in FIG. 19, and they are also indicated in FIG. 3 as being mounted on a bracket 14 suspending them below the rockers R.

Referring to FIGS. 3, 4 and 5, levers 20 and 21 are pivotally mounted in spaced relationship on the machine frame 1. One arm of each of said levers is pivotally connected at 22 to an end of a rack bar 23 which is normally biased by a spring 24 to the downward direction relative to FIG. 3. The lever 21 is an actuating lever and its other arm is pivotally connected at 25 to the outer end of a plunger 26 of a bar-operating solenoid BS. In the downward position of the rack bar 23 relative to FIG. 3, the projection ends 12 on the rockers R are free to pass down in the spaces between the teeth 27 of said rack bar when said rockers are swung to their downward position by the respective keys. When, however, the bar 23 is moved toward the right, with reference to FIG. 5, the key operated rockers R are engaged by the rack-bar-teeth 27 and held against any movement in a return direction until the bar 23 is returned by the spring 24. Also in the rightward position (not shown), the careless depression of any other key cannot swing any of the other rockers down, since these are blocked by the teeth of the rack bar 23 to a position blocking operation of any of the other coin control switches.

When any key K is depressed, which in turn, through its projection P, depresses or actuates any rocker R, which motion in turn swings down bar 5, the actuating pin 8 of switch IS is thereby moved (see FIGS. 3 and 4) in a direction away from the initiating switch IS mounted on a bracket 28 which in turn is mounted on support bracket 6a (see FIG. 4). This allows the actuator 9 to return to an unoperated position and actuate its N.C. contact to close (the N.O. contact of IS is held closed when the equalizing bar 5 is in the returned unoperated position, and its N.C. contact is at the same time held open), thereby closing a circuit to energize solenoid BS whose plunger through the intermediate linkage 21 and moves the rack bar 23 to lock in operated position the rockers involved, as explained above. Also, as the equalizing bar 5 swings downward relative to FIG. 4, the actuator 10 for the motor switch MS is operated causing the N.O. contact of MS to close to energize the motor circuit of the dispensing unit of the machine.

Figure 19:
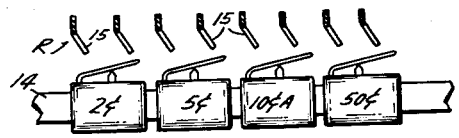
FIG. 19 is a detailed vertical sectional view taken on the line 19—19 of FIG. 3.

The 25¢ rocker R has suspended under it two coin switches labelled 25¢B and 25¢A whose actuators are operated by said rocker, and said coin switches being mounted on a bracket 29 in a manner similar to that in which the coin switches in FIG. 19 are mounted on their bracket 14, said bracket 29 being mounted at its ends on support brackets 6 and 6a.

Figure 17:
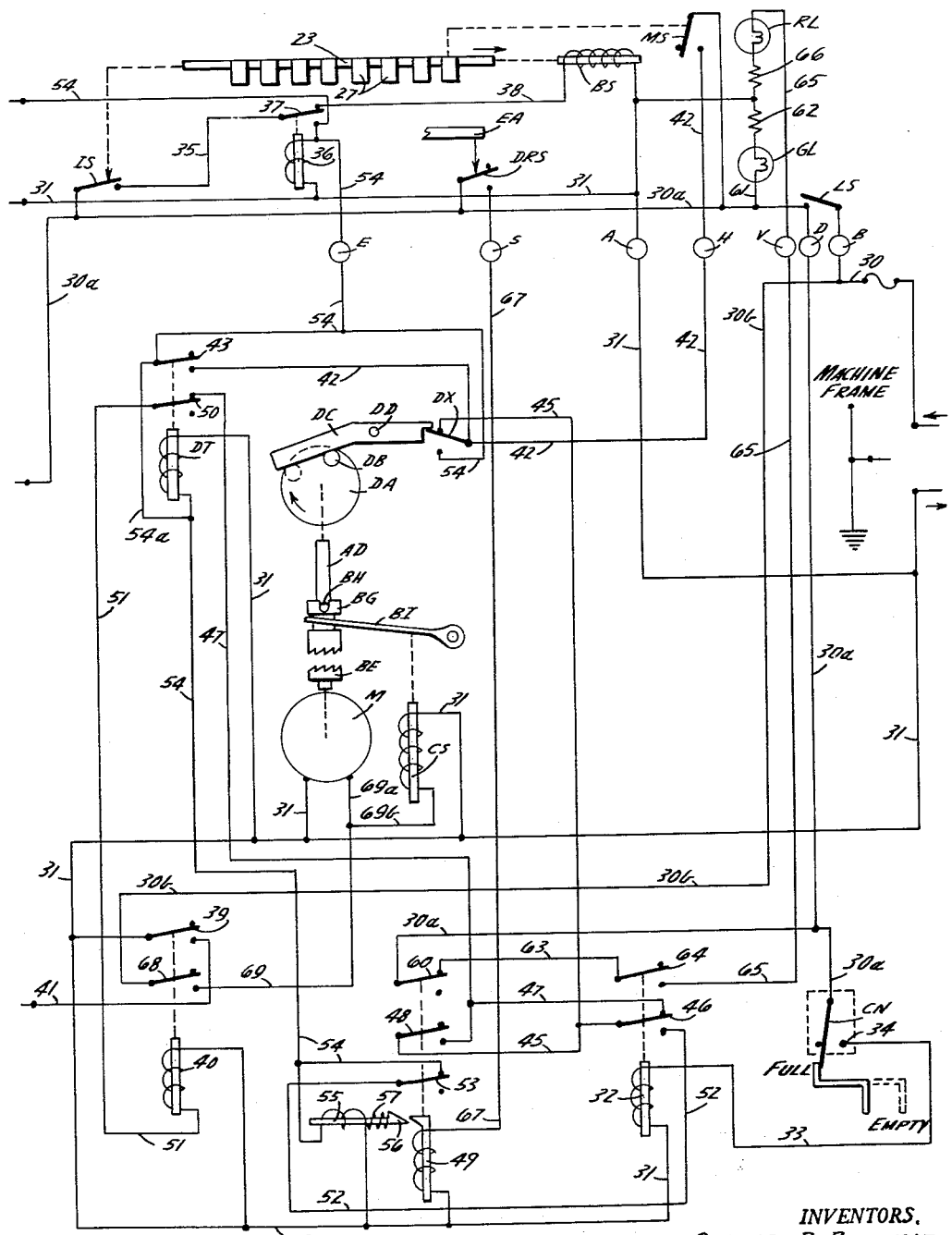
FIG. 17 is the right hand side of the circuit diagram shown in FIG. 16 associated with parts in the dispensing unit.

Referring now to FIGS. 16 and 17 (the former drawing relating to the preferred embodiment), a current supply line 30 has branch conductors 30a and 30b, conductor 30a including a manually operated line switch LS. The "common" connection terminal of each of the coin switches 1¢, 2¢, 2¢A and 5¢ is connected directly to conductor 30a. The N.O. contact terminal of each of the coin switches 1¢, 2¢, 2¢A, 10¢, 10¢A, 25¢ and 50¢ is connected directly to their respective solenoids S1¢, S2¢, S2¢A, S10¢, S10¢A, S25¢ and S50¢ by the branch conductors (see FIG. 16) respectively leading to the separable terminals J, F, L, R, T, U and P, respectively. These separable connections as well as terminals E, S, A, H, V, D and B may be made by means of a plug-in cable (not shown) from a remote location, where desired. The "common" connection terminal of coin switches 10¢, 10¢A, 25¢, 25¢A, 25¢B and 50¢ along with the N.C. contact terminal of coin switches 5¢, 25¢A and 25¢B as well as the N.O. contact terminal of coin switches 5¢, 25¢A and 25¢B are all connected into an integrated electrical system that deals with tender bases of less than $1.00 but allowing the 5¢, 10¢, 25¢ and 50¢ coins to be dispensed when called for when the tendered money is one dollar.

A current return line 31 connects to one terminal of the coil of relay 32 whose other terminal is connected by a conductor 33 to the N.C. contact terminal 34 of the switch CN and through said switch CN to conductor 30a. A branch circuit runs through conductor 30a, to the "common" terminal of switch IS, through its N.O. contact and connector 35 through relay 36 N.C. contact 37, and by conductor 38 through solenoid BS to return line 31.

Return line 31 also connects through N.O. contact 39 of relay 40 and the common conductor 41 to the other terminal ends of the solenoids S1¢, S2¢, S2¢A, S5¢, S10¢, S10¢A, S25¢ and S50¢.

Conductor 30a also connects through the normally closed switch MS by conductor 42 to the common terminal of switch DX, and to the N.O. contact 43 of relay DT. The relay DT is provided to operate in combination with the switch DX as a simplified and positive means for interlocking the operation of the dispensing unit and assuring "single-cycle" operation thereof. Thus for each depression of a payment key K only one payment shall occur, since only one rotation of the shaft AD will be permitted to take place because of the combined operation of the relay DT and its contacts in combination with the contacts of the switch DX and relay 36 contact 37, as will hereinafter be described. The device as heretofore described in connection with the electrical control unit of the aforementioned copending application, Serial No. 721,743, utilized a relatively complex mechanical interlock to serve this function.

The normally closed terminal of switch DX connects via conductor 45 to the common terminal of switch contact 46 of relay 32 through N.C. branch of said contact to conductor 47 (also via conductor 45 through N.O. contact 48 of relay 49 to conductor 47), thence through relay DT N.C. contact 50, via conductor 51 to a terminal of coil of relay 40, through said coil to return line 31; also via said conductor 45 to the common terminal of relay 32 contact 46 through the normally open branch of said contact via conductor 52 through N.C. contact 53 of relay 47, via conductor 54 to coil 55 of latch release 56 (latch release 56 is equipped with return spring 57 which returns latch release 56 to normal position after coil 55 is deenergized and which also holds latch 56 in "latched" position after any time that relay 49 is energized) and through said coil 55 to return line 31, also via said conductor 54 to one terminal of the coil of relay DT and through said coil to return line 31, also via branch conductor 54a to the common terminal of relay DT contact 43, also via conductor 54 to the N.O. terminal of switch contact DX, also via conductor 54 to the separable connector terminal E. Terminal E also connects via conductor 54, through the coil of relay 36 to return line 31, also via conductor 54 to N.O. terminal of contact 37 of relay 36, also via conductor 54 through release solenoid RS to return line 31.

Switches 39 and 68 are relay operated switches or contacts controlled by relay coil 40. Switches 46 and 64 are relay operated switches or contacts controlled by relay coil 32. Switches 48, 53 and 60 are relay operated switches or contacts actuated by relay coil 49 to close the N.O. parts of said switches or contacts: Once the N.O. parts of the switches are closed they are held closed by the action of the mechanical latch 56 under the pressure of its spring 57, and said closed contacts re-open only when coil 55 is energized to withdraw the latch 56 and release the pressure on contacts 48, 53 and 60. Switches 43 and 50 are relay operated switches or contacts under the control of relay DT. Switch 37 is a relay operated switch or contact controlled by relay coil 36.

A conductor 61 connects conductor 30a to green lamp GL, thence through said lamp and resistor 62 to return line 31, while a circuit runs from conductor 30a through relay 49 N.C. contact 60 and follows conductor 63 to relay 32 N.O. contact 64 thence through said contact to red lamp RL via conductor 65, thence through said lamp and resistor 66 to return line 31. The lit green lamp GL indicates that the "on-off" switch LS has been closed and that the machine is ready for use providing that no coin channels are empty.

A branch circuit runs from conductor 30a through the N.O. contact of the "depletion release switch" DRS (operated by the action of "depletion release" key when depressed) N.O. contact thence along conductor 67 to the coil of relay 49 and through said relay coil to return line 31. Another branch circuit runs from conductor 30 along conductor 30b and through the N.O. contact 68 of relay 40 to and along conductor 69 to a junction of conductors 69a and 69b. From the junction mentioned in the preceding sentence, a circuit runs via conductor 69a to and through motor M to return line 31, while another circuit runs via conductor 69b to and through the motor clutch solenoid CS to return line 31.

In the above described circuits, when an operator depresses one of the keys K of the keyboard to operate one or more of the rockers R, this rocker is (or these rockers are) swung down to engage and swing equalizer bar 5 down to engage the actuator 9 of switch IS (see FIG. 3) to close this switch, and thereafter the actuated rocker or rockers R also act to close one or more of the coin switches controlling the coin ejector positioning solenoids.

After the on-off switch LS has been closed previous to an operator depressing any key K, on closure of switch IS, current from conductor 30a passes through switch IS to conductor 35 and (assuming all coin channels are adequately supplied—no depleted channel in tray T) through relay 36 N.C. contact 37 along conductor 38 to energize rack bar solenoid BS and to operate the rack bar 23 to mechanically further draw down the rockers R (because of the ends of the rocker projections 13 being engaged with and locked by the rack-bar teeth 27) which motion serves to complete the motion of the equalizing bar 5 which bears against the actuator of the motor switch MS to operate the switch fully. The closure of switch MS causes current to flow through conductor 42 and the N.C. contact of switch DX along conductor 45 through the normally closed contact 46 of relay 32 and conductor 47, thence through relay DT N.C. contact of switch 50 and conductor 51 to energize relay 40, closing switch contacts 39 and 68.

Closure of switch contact 39 causes current to flow from conductor 31 along conductor 41 (now see FIG. 16) to the common connection of all the coin finger solenoids S1¢, S2¢, S2¢A, S5¢, S10¢, S10¢A, S25¢ and S50¢. If, for instance, the key K that has been depressed happens to be #64, calling for the payment of 36¢ change, the solenoids S1¢, S10¢ and S25¢ will be consequently energized to position the respective coin fingers in coin ejecting position, due to the fact that under that condition the coin switches 1¢, 10¢ and 25¢ will have been operated by their respective associated rockers R.

Upon closure of switch contact 68, current flows from conductor 30b through contact 68 to conductor 69, thence to conductor 69b and clutch solenoid CS and concurrently to conductor 69a to the drive motor M, thereby causing clutch faces BE and BF (see FIGS. 7 and 11) to engage to permit motor M to rotate shaft AD and crank disk AC and crank pin AB. The rotation of crank pin AB, through the links AA, causes the levers AG to be swung clockwise (FIG. 7) so that the solenoid positioned fingers AE act on the coins in their associated coin channels to eject the coins therefrom into a discharge chute (or coin chute) CC from which through suitable chute structure (not shown) they are carried out of the machine.

As the motor M continues to operate and rotate shaft AD, crank disk DA also rotates with it as does crank pin DB which operates lever DC to swing it to operate switch DX through the intermediate action of its actuator DG. The operation of switch DX causes the circuit through conductor 45 to be broken, causing the deenergization and consequent dropping out of relay 40 and the opening of contacts 39 and 68 causing the deenergization of the coin finger solenoids S1¢, S10¢ and S25¢ and of the motor M and of clutch solenoid CS. Even though the motor M at this time has been deenergized, the motive system is forced to complete its cycle to its initial normal position because of three influencing conditions:

(1) The deenergization of clutch solenoid CS along with motor M and the consequent "freeing" of the mechanical motive system and allowing to "coast" if it so wills.

(2) The motive and rotational inertia of the system.

(3) The forcible action of spring CT (see FIG. 7) upon the cam-acting parts CU, CV, CO to cause CU to move levers AG and the other moving parts to their initial normal positions.

Also, as the switch DX is operated, its normally open contact is closed establishing a current flow to conductor 54 (after the breaking of the circuit to conductor 45) and causing the operation of relays 36 and DT, thus providing further assurance that the circuit that causes energization of clutch solenoid CS and motor M and the finger positioning solenoids S1¢, S10¢ and S25¢ shall remain broken because of the opening of the relay DT N.C. contact 50. This action makes certain that erroneous unintentional payment of coin shall not occur due to self re-cycling of the machine, and is provided by means of the electrical interlocking arrangement through the relay 36 contact 37. The electrical interlock is an improved and simplified means for accomplishing a result similar to that provided by the relatively complex mechanical arrangement of copending application, S.N. 721,743. If the operator has removed his finger pressure from key K #64, no subsequent current flow will take place to conductor 45 as the crank pin DB moves from the phantom position to its solid circle position, shown in FIG. 14, allowing the switch DX to re-establish its connection to conductor 45, and erroneous repetitious payment by the machine is prevented from another different standpoint, since the operation of relay 36 contact 37 has broken the flow of current to the rack solenoid BS allowing the rack and consequently the rockers R and bar 5 to return to their initial normal positions and allowing the switches MS and IS to open and remain so.

If, however, the operator's finger remains on the key K to a forcible degree sufficient to maintain in an operated condition not only switch IS, but also switch MS as well, the machine still cannot re-cycle itself (see FIG. 17) and cause a repetitious payment since relay 36 contact 37 has already been operated, as afore-described, providing a flow of current to be maintained through switch IS and along conductor 35, through contact 37 to conductor 54, maintaining in an operated position relay 36, assuring a maintained circuit through its contact 37 to conductor 54 and to relay DT and maintaining the relay DT contacts 50 (to maintain an open circuit to coil of relay 40, preventing energization of motor M and clutch solenoid CS) and 43 to effectively cause relay DT to maintain itself also "locked-in" through the "back-circuit" through contact 43 and conductor 42 and switch MS to supply line 30a.

Also, if the operator's finger is allowed to remain on key K to a degree to maintain only switch IS in the operated position, the machine still will not re-cycle itself, since by the same logic, the motor M and clutch solenoid CS are prevented from being energized.

In the event that the coins in any one of the coin channels become depleted, the finger CB (see FIG. 7) of that channel moves outwardly into the channel to release the pressure of the spring CG on lever CD which effectively is the actuator for switch CN so that switch blade CN may move into contact with terminal 34 (FIG. 17). Then, current will flow through the switch CN from supply line 30a through terminal 34 and conductor 33 to energize relay 32 through return line 31, operating relay contacts 46 and 64. Operation of contact 64 causes a current flow from conductor 30a through relay 49 N.C. contact 60 along conductor 63 through the relay 32 N.O. closed contact 64 along conductor 65 through red light RL and thence through resistor 66 to return line 31, lighting the red light and indicating to the operator that one or more coin channels are empty and that before any subsequent operation of the machine could take place the operator will need to either replenish the depleted channels or, to depress the "depletion release" key DR (see FIG. 1), in order to provide dispensing of one payment before absolutely being required to replenish the depleted coin channels. Also, operation of relay 32 contact 46 causes the circuit from conductor 45 to relay 40 to be broken, preventing the possibility of relay 40 contact 68 starting the motor M and preventing any finger positioning solenoids from operating. A circuit is also set up through conductor 52 and relay 49 N.C. contact 53 along conductor 54 to relay DT and its contact 43, as well as to relay 36 and its contact 37 to effectively, through the opening of relay DT contact 50, prevent any motion by either the drive motor M and the clutch solenoid CS, or any of the finger positioning solenoids, in the event any key K should be depressed scheduling a payment while any one or more of the coin channels should be depleted. Also, the depressing of any key K while a coin channel is empty would cause the immediate energization of relay 36 and operation of its contact 37, deenergizing the solenoid BS and causing relay 36 to "lock itself in" and hold itself in the operated position along with relay DT, furnishing the desirable safe condition indicated in the latter part of the preceding statement, as long as key K is depressed.

On closure of DRS by an operator, current from 30a flows through DRS along conductor 67 to the coil of relay 49 and through said coil to return line 31, causing relay 49 to operate and be latched into the operated position by the action of latch 56 and its associated spring 57. Operation of relay 49 causes its contacts 48, 53 and 60 to be operated. The operation of relay 49 N.C. contact 53 causes the breaking of the circuit between the motor switch MS through conductor 42, through switch DX, along conductor 45, through relay 32 contact 46 along conductor 52 and the two relays DT and 36, thus nullifying the payment-blocking action of relay DT contact 50. Operation of relay 49 N.O. contact 48 causes a circuit to be established from switch MS along conductor 42 through switch DX N.C. contact along conductor 45 through the now closed contact 48 and along conductor 47 through relay DT N.C. contact 50, along conductor 51 and through relay coil 40 to return line 31 to make it possible for the machine to make one normal payment without hindrance and without having to first replenish the depleted coin channel. Operation of relay 49 N.C. contact 60 causes interruption of the circuit feeding the red light RL, and the interruption of the red light signals the operator that the machine is prepared to make a normal payment.

When a key K is depressed and the switch MS is closed, current passes to conductor 42, the normally closed contact of switch DX, conductor 45, through relay 49 N.O. (now closed) contact 48, conductor 47, relay DT N.C. contact 50, along conductor 51 and through the coil of relay 40 to return line 31, thereby to operate relay 40 and its contacts 39 and 68 so that the machine operates, as previously described, to normally dispense the proper coins. Then on completion of payment or dispensing cycle, the conductor 54 also energizes the unlatching solenoid coil 55 so that relay 49 is released from its latched position opening switch contacts 48, 53 and 60.

Thereafter, upon proper replenishment of the depleted coin channel or channels the machine will be ready for normal operation.

In the keyboard are included five (5) special keys, indicated in FIG. 1 as keys with encircled numbers and numbered 5, 10, 25, 50 and 100. These keys are furnished with the proper quantity and arrangement of projections P (FIG. 5) to operate the proper rockers R, so that when any one of the five keys is depressed the proper amount of coins are dispensed to total the value in coin indicated on the key that has been depressed. For instance, the "5" key will cause 5 pennies to be ejected from coin channels A, B and C. The "10" key will act to dispense 5 pennies and 1 nickel from channels A, B, C and D. The "25" key will act to dispense 2 dimes and 1 nickel from channels D, E and F. The "50" key will act to dispense 2 dimes, 1 nickel and 1 quarter from channels D, E, F and G. The "100" key will act to dispense 2 dimes, 1 nickel, 1 quarter and 1 half-dollar from channels D, E, F, G and H. Except for the coins scheduled to be dispensed, the operation of the machine under the influence of any one of these five keys is the same as that described in preceding paragraphs.

Referring again to FIG. 1, it will be seen that there are five different "range" keys provided in the front end of the keyboard, labeled "5," "25," "50," "75" and "0" and indicated symbolically as 5r, 25r, 50r, 75r and 0r, respectively, from left to right, coming into play when tender is less than $1.00.

Referring to FIGS. 3, 5, 6, 8 and 9, a mounting plate 80 is provided mounted at the front end of the keyboard plates as indicated in FIG. 2. On plate 80 are mounted the five range keys mentioned in the preceding paragraph, along with their special stems 81 and associated guide plates 82 and 83, and latch bar 84, as well as the switches operated by each and also the release cam bar 85 and its associated operating solenoid RS. The seven microswitches of the present embodiment (comprising switches $5s_1$, $5s_2$, $25s$, $50s$, $75s$, $0s_1$ and $0s_2$) are of a single-pole double-throw type, as shown in FIG. 16, with the normally opened contacts isolated from the normally closed contacts. It can be seen that the 5r button, when operated, actuates the two switches $5s_1$ and $5s_2$, while button 25r operates the switch 25s, the 50r button operates the switch 50s, the 75r button operates the switch 75s, and the 0r button operates the two switches $0s_1$ and $0s_2$. The five range keys respectively include latch points 86 extending from the special stems 81. The keys are each yieldingly held in position in guiding slots in the upper guide plate 82 and the lower guide plate 83 by the loaded compression springs 87. The lower guide plate 83 is mounted spacially relative to the upper guide plate 82 by means of spaced intermediate spacer 88. When any of the five "range" keys is depresesd, as is shown in the case of 50r in FIG. 5 and 5r in FIG. 9, the stem 81 moves downwardly and operates the actuator 89 of the microswitches $5s_1$ and $5s_2$ (see FIG. 6), while its latch point engages the latch bar 84 at its bottom edge (as shown in FIGS. 6 and 9). The latch bar 84 is pivotally mounted on a pivot rod 90, which is supported by bent ends of upper guide plate 82. When any other of the keys is depressed, the engagement of that key latch point 86 with the latching edge of the latch bar 84 causes said latching edge to be displaced a sufficient degree to release any range key or keys that have previously been held in the latched position, the released range key or keys then being returned to the unoperated position. Also, at any time that solenoid RS is operated, its plunger 91 is drawn downwardly carrying with it the latch release 85, since it is pivotally joined to the plunger 91 by pivot pin 92. As the latch release 85 descends, its cam edge causes the latch bar 84 to be swung outwardly to the left (see FIG. 5) to release any range key stems that are then latched in the operated position. As further illustration, the range key 50r is shown unlatched in FIG. 8, while in FIG. 9 we see range key 5r in a latched position with the two switches $5s_1$ and $5s_2$ operated.

By depressing any particular one of the five range keys, an operator may select any tender basis for the machine to work from, causing certain coin omissions or additions to take place as required in order to provide proper payment of change. The following description will traverse the different sequences of function involved when any one of these five keys is operated and latched. All tendered amounts mentioned will be less than $1.00, and any mention of "normal change" will denote the proper change normally to be expected from a tender of $1.00. Any key K which is depressed to schedule a payment must correspond in its number to the amount of the purchase involved.

Thus, when a quarter is tendered and the purchase amounts to 21¢ or any other figure less than 25¢, the 25r key should be depressed. Then, for a 24¢ sale the keyboard key #24 should be depressed and the change dispensed will be 1¢ from the "A" channel of the coin tray T. Normal change would be: 1 half-dollar, 1 quarter, and 1 cent. Depression of the 25r key, however, prevents the half-dollar and the quarter from being dispensed by preventing the energization of the finger positioning solenoids S25¢ and S50¢. It can be observed from FIG. 16 that the circuit will be interrupted between S50¢ and conductor 30a, since the 25s contact is open between conductor 101 and 102. By the same token, it can be seen that the respective circuits between S25¢ and conductor 30a will also be interrupted, since S25¢ and S50¢ solenoids are effectively connected in parallel. At any time when the machine is operated, using a prior depression of any one of the five range keys, upon completion of payment of coin (see FIG. 17), the closure of the N.O. contact of switch DX will provide current flow from conductor 30a through switch MS and along conductor 42; through switch DX to its N.O. contact terminal and along conductor 54 to the release solenoid RS, energizing it to release the particular key previously latched in, and putting the machine in position to be used for a subsequent payment.

When a purchase amounts to 49¢, and a half-dollar is tendered, the 50r key is the one that should be depressed first. Normal change would be a half-dollar coin and a cent; but by inspection it can be seen that the circuit will be interrupted between S50¢ and the conductor 30a, since switch 50s is open between conductors 101 and 103, and only the cent is dispensed. As pointed out in the preceding paragraph, upon the completion of payment the machine is returned to its original position.

When a purchase is for 74¢, and a quarter and a half-dollar is the tendered coin, the 75r key should be priorially depressed. Normal change would be 1¢ and a quarter; but only the center will be dispensed (referring to FIG. 16) since there is no circuit between the conductor 30a and solenoid S25¢, since switch 75s is open between conductors 102 and 104.

Next, consider the conditions prevailing when the tendered amount is a nickel (5¢), or any combination of nickel or silver coin, or nickel and silver coin whose value is a figure ending in 5 (5¢, 15¢, 35¢, 45¢, 55¢, 65¢, 85¢ or 95¢) except 25¢ or 75¢, and for which the proper change would never exceed 9¢ (a nickel and 4¢). For our discussion, we will consider only those transactions for which the proper change would be either 6¢ or 1¢—transactions involving payment of change that would involve more than 1¢ would not more fully further this presentation to a profitable degree. First of all, the only one of the five range keys used will be the 5r key, and it is always depressed before scheduling the machine by depressing the proper key K. At any time that the 5r key is depressed, it can be seen from FIG. 16 that the two switches $5s_1$ and $5s_2$ have their N.C. contacts opened and their N.O. contacts closed, and they remain so as long as key 5r remains operated and in latched position. We will now traverse the logic of the machine's function involved for the different tenders referred to above, to wit:

5¢

For a 4¢ sale, the normal change is 50¢, 25¢, 10¢, 10¢, 1¢. So when tender is a nickel, the coins other than a cent must be eliminated. Referring to FIG. 16, it can be seen that, on depression of range key 5r, prior to depression of K key #4, there is no circuit between wire 30a and S50¢. Since normally closed contact of $5s_1$ is now open from 30a to 105, there is no circuit from wire 30a to the S50¢ solenoid. Similarly, there is no circuit between wire 30a and the two dime solenoids S10¢ and S10¢A, as well as the S25¢ solenoid, for the same reason that there is no circuit to the S50¢ solenoid. Consequently, all that is dispensed is one cent.

15¢

For a 14¢ sale, the normal change is 50¢, 25¢, 10¢, 1¢. It is evident that the 50¢, 25¢ and 10¢ coins must be eliminated. Referring again to FIG. 16, we see that no circuit exists between wire 30a and any of the three solenoids S50¢, S25¢ and S10¢, because of the fact that the normally closed switch contact of $5s_1$ is opened between 30a and wire 105. Only the 1¢ coin is dispensed.

35¢ a. For a 29¢ sale, when working with tender of a quarter and a dime, the normal change is 50¢, 10¢, 10¢, 1¢, and the half-dollar and dimes must be omitted. Referring to FIG. 16, we see that no circuit exists between wire 30a and the three solenoids S50¢, S10¢ and S10¢A. Since again the contact of $5s_1$ is opened by prior depression, the circuit from 30a to wire 105 will be interrupted to the finger solenoids involved. However, to make the correct change we must add a nickel coin to be dispensed. Thus, it will be apparent that a circuit must be established between wire 30a and the solenoid S5¢ through the N.C. contact of coin switch 5¢ to conductor 106, and through normally open switch contact of $5s_2$ (now closed), to conductor 107, and thence through the N.C. contact of the coin switch 25¢B to conductor 108, and consequently the nickel is added to the change dispensed.

b. For a sale of 34¢, when tender is any combination of nickel or silver coin or nickel and silver coin totaling 35¢, the normal change is 50¢, 10¢, 5¢, 1¢, and all the coins except the cent must be omitted. Referring to FIG. 16, it will be observed that no circuit exists to the S50¢ and the S10¢ solenoids because in this case again the N.C. contact of $5s_1$ is open from 30a to 105. Also, no circuit exists between wire 30a and the S5¢ solenoid, since, even though the coin switch 5¢ is operated, the N.C. contact of $5s_2$ is opened from wire 109 to wire 108, as is also the N.O. contact of the coin switch 25¢B between wires 110 and 108, and also the N.O. contact of $0s_2$ between 111 and 112. Consequently, the nickel is omitted and only the cent is dispensed.

45¢ a. For a 39¢ sale, the normal change is 50¢, 10¢, 1¢, and the 50¢ and 10¢ coins must be omitted when working with a tender of a quarter and two dimes. Again, referring to FIG. 16, we see that we have no circuit between wire 30a and the two solenoids S50¢ and S10¢ since the N.C. switch contact of $5s_1$ is opened, on depression of key 5r, prior to depression of K key #39, between 30a and 105; but for a 39¢ sale from 45¢ tender, a nickel must be dispensed along with the 1¢ coin; so we can see the circuit from wire 30a through the N.C. contact of coin switch 5¢ along 106, through N.O. contact $5s_2$ (now closed) to 107, then through 25¢B coin switch N.C. contact to 108, and the nickel is dispensed along with the cent, giving the correct change.

b. For a sale of 44¢, the normal change is 50¢, 5¢, 1¢, and when tender is any combination of silver and/or nickel coin totalling 45¢, the nickel and 50¢ coins must be omitted from the dispensed change. In this instance the circuit is interrupted to the S50¢ solenoid (see FIG. 16), since again the normally closed contact of $5s_1$ is open from 30a to 105. Also the S5¢ solenoid is inoperative since the $5s_2$ contact is open from 109 to 108. The dispensed change is one cent.

55¢ a. For a sale of 49¢, normal change is 50¢, 1¢. When tender is three dimes and one quarter, the 50¢ must be omitted and a nickel must be added. Referring to FIG. 16, it will be apparent that the circuit to the S50¢ solenoid is broken by the contact of $5s_1$ being open between 30a and 105; and also the nickel is dispensed along with the and the penny since we have a circuit from 30a through the 5¢ coin switch N.C. contact to 106 through the N.O. (now closed) contact of $5s_2$ to conductor 107, and through the coin switch normally closed 25¢B contact to 108.

b. For a sale of 54¢, normal change is 25¢, 10¢, 10¢, 1¢. When tender is any combination of silver and/or nickel coin totalling 55¢, the normal change 25¢ and two 10¢ coins must be omitted. Referring to FIG. 16, the $5s_1$ contact will be open between 30a and 105, there is no circuit to the S25¢ and the two dimes solenoids, and the correct change is dispensed.

65¢ a. For a sale of 59¢, normal change is 25¢, 10¢, 5¢, 1¢. When working with a tender of a quarter and four dimes, the normal change 25¢ and 10¢ must be omitted. In this case (referring to FIG. 16) the circuit to the S25¢ solenoid is interrupted by the $5s_1$ N.C. contact (now open) between 30a and 105, and also there consequently is no circuit to the S10¢ solenoid. The nickel is dispensed along with the 1¢ coin, since we have a circuit from 30a through the 5¢ coin switch N.O. (now closed) contact to 111 through the N.O. (now closed) $5s_1$ contact to 110 and through the coin switch 25¢B N.O. contact (now closed) to 108.

b. For a sale of 64¢, normal change is 25¢, 10¢, 1¢. When the tender is any combination of nickel and/or silver coin totalling 65¢, the 25¢ and 10¢ coins must be omitted. Again (referring to FIG. 16), since the N.C. contact of $5s_1$ is open between 30a and 105, the quarter and the dime are omitted from the dispensed change.

85¢ a. For a sale of 79¢, normal change is 10¢, 10¢, 1¢. When the tender is a quarter and six dimes, the normal change two dimes must be omitted, and a 5¢ coin must be added to the dispensed change. Referring to FIG. 16, the circuit to the two dime solenoids S10¢ and S10¢A is broken by the (now opened) N.C. contact of $5s_1$ from 30a to 105, omitting the two dimes. Also, the S5¢ solenoid is energized through the circuit from 30a through the 5¢ coin switch N.C. contact to 106 through the N.O. (now closed) contact of $5s_2$ to 107 through the 25¢B coin switch N.C. contact to 108. Therefore the correct change of 6¢ is dispensed.

b. For a sale of 84¢, normal change is 10¢, 5¢, 1¢. When tender is any combination of nickel and/or silver coins totalling 85¢, the 10¢ and 5¢ coins must be omitted. Referring to FIG. 16, after depression of the range key 5r, prior to depression of K key #84, no circuit exists to the S10¢ solenoid for the same reason that is pointed out in the previous paragraph. Also, the 5¢ solenoid circuit is broken by the (now opened) N.C. contact of $5s_2$ from 109 to 108, as well as by the N.O. contact of $0s_2$ from 111 to 112 and 25¢B from 110 to 108. Thus, only the cent is dispensed.

95¢ a. For a sale of 89¢, normal change is 10¢, 1¢. When tender is seven dimes and a quarter, the 10¢ coin must be omitted and a nickel coin added. On depression of the 5r range key (referring to FIG. 16), the S10¢ solenoid has a broken circuit, since the N.C. contact of $5s_1$ is now open between 30a and 105. Also, the S5¢ solenoid has a completed circuit from wire 30a through the N.C. contact of the coin switch 5¢ to 106, through the (now closed) N.O. contact of $5s_2$ to 107, through the N.C. contact of coin switch 25¢B to 108. The correct 6¢ change is dispensed.

b. For a sale of 94¢, normal change is 5¢, 1¢. When tender is any combination of nickel and/or silver coin totalling 95¢, naturally the nickel must be omitted. Thus, on depression of the 5r key, prior to depression of K key #94, the S5¢ solenoid has no circuit from wire 30a since, even though the coin switch 5¢ is operated, there are open circuit points at the N.O. contact of $0s_2$ between 111 and 112, and also at the N.O. contact of the coin switch 25¢B between 110 and 108, and at the (now opened) N.C. contact of $5s_2$ between 109 and 108. Thus, the correct 1¢ change is dispensed.

Now then, let us consider the conditions in effect when the tendered amount is a dime or any combination of nickel and/or silver coin whose value is a figure ending with 0 excepting 50¢ (such as 10¢, 20¢, 30¢, 40¢, 60¢, 70¢, 80¢, 90¢) and for which the proper change would never exceed 9¢. For our discussion, we will consider only those transactions for which the correct change would be either 6¢ or 1¢, as consideration of transactions involving payment of change involving more than 1¢ would not more fully further this presentation to a profitable degree. First of all, the only one of the five "range" keys used will be the 0r key, and it is always depressed before scheduling the machine by depressing the numbered key corresponding to the amount of the purchase. At any time that the 0r key is depressed, it can be seen from FIG. 16 that the switch contacts of $0s_1$ and of $0s_2$ are operated and remain so as long as key 0r remains operated and latched. We will now traverse the logic of the machine's function involved for the different tenders referred to above, to wit:

*10¢* a. For a sale of 4¢, normal change is 50¢, 25¢, 10¢, 10¢, 1¢. When the tender is one dime, the normal change coins must be omitted, with the exception of the cent, and a nickel must be added. Thus on depression of key 0r, prior to depression of K key #4 (referring to FIG. 16), the S50¢ solenoid and the two dime solenoids S10¢ and S10¢A, as well as the S25¢ solenoid, are open-circuited because of the open condition of the N.C. contact of 0s, between 104 and 105. But a nickel is dispensed along with the cent since there is a circuit established to the S5¢A solenoid, from wire 30a through the N.C. contact of the coin switch 5¢ to 106, through the (now closed) N.C. contact of $0s_1$ to 114 through the (now closed) N.O. contact of coin switch 25¢A to 80.

b. For a 9¢ sale, the normal change is 50¢, 25¢, 10¢, 5¢ and 1¢. When tender is one dime or two nickels, the cent must be the only coin dispensed. Here (referring to FIG. 16) the S50¢, S25¢ and S10¢ solenoids are opened circuited at the point of the opened N.C. contact of 0s between 104 and 105. The 5¢ coin is omitted since the S5¢ solenoid is opened circuited at the following points: The N.O. contact $5s_1$ between 111 and 110, the (now opened) N.C. contact of $0s_2$ between 111 and 109, and the (now opened) N.C. contact of the coin switch 25¢A between 112 and 108. Consequently the cent is the only coin dispensed.

*20¢* a. For a sale of 14¢, normal change is 50¢, 25¢, 10¢ and 1¢. When tender is two dimes, the cent is the only normal coin to be dispensed, with a nickel added. On depression of key 0r, prior to depression of K key #14, (referring to FIG. 16) the S50¢, S25¢ and S10¢ solenoids are open-circuited at the point where the N.C. contact of $0s_1$ is open between 104 and 105. There is a circuit to the S5¢ solenoid (so that a nickel may be dispensed) from wire 30a through the N.C. contact of the coin switch 5¢ to 106, through the N.O. (now closed) contact of $0s_1$ to 114, through the (now closed) N.O. contact of the coin switch 25¢A to 108. Thus, the correct change of 6¢ will be dispensed.

b. For a sale of 19¢, normal change is 50¢, 25¢, 5¢, 1¢. When tender is any combination of silver and/or nickel coin totalling 20¢, all coins but the cent must be omitted. Referring to FIG. 16, the S50¢ and S25¢ solenoids are open-circuited at the now open N.C. contact of $0s_1$ between 104 and 105, and the S5¢ solenoid is open-circuited even though the coin switch 5¢ is operated, at the following three points: at the N.O. contact of $5s_1$ from 111 to 110, at the N.C. contact of $0s_2$ (now opened) N.C. contact of the coin switch 25¢A from 112 to 108. The cent is the only coin dispensed.

*30¢* a. For a sale of 24¢, normal change is 50¢, 25¢ and 1¢. When the tender is three dimes, the cent is the only normal coin to be dispensed; but a nickel must be added to the dispensed change. Here, the S50¢ and S25¢ solenoids will be open-circuited, referring to FIG. 16, since the N.C. contact of $0s_1$ is open between 105 and 104, and a nickel is added to the dispensed change, since there is a circuit from 30a through the 5¢ coin switch N.C. contact to 106 through the (now closed) N.O. contact of $0s_1$ to 114, through the N.O. contact (now closed) of coin switch 25¢A to 108. The correct 6¢ change is dispensed.

b. For a sale of 29¢, normal change is 50¢, 10¢, 10¢A and 1¢. When the tender is any combination of silver and/or nickel coin totalling 30¢, the cent is again the only normal coin to be dispensed. Here, on depression of range key 0r, prior to depression of K key #29, referring to FIG. 16, the open condition of the N.C. contact of $0s_1$ between 105 and 104 is responsible for the non-energization of the S50¢, S10¢ and S10¢A solenoids. Therefore the correct 1¢ change is dispensed.

*40¢* a. For a sale of 34¢, normal change is 50¢, 10¢, 5¢ and 1¢. When the tender is four dimes, the normal half-dollar and dime coins must be omitted. Here, referring to FIG. 16, the S50¢ and S10¢ solenoids are open-circuited by the open condition of the N.C. contact of $0s_1$ between 105 and 104. Also, in order to make the correct 6¢ change, the S5¢ solenoid is energized through a circuit from 30a through the (now closed) N.O. contact of the coin switch 5¢ to 111, through the (now closed) N.O. contact of $0s_2$ to 112, through the N.C. contact of coin switch 25¢A to 108.

b. For a sale of 39¢, normal change is 50¢, 10¢ and 1¢. When the tender is any combination of silver and/or nickel coin totalling 40¢, the 50¢ and 10¢ coins must be omitted. In this case, referring to FIG. 16, it can be seen that the S50¢ and S10¢ solenoids are open-circuited at the (now open) N.C. contact of $0s_1$ between 105 and 104. The cent is the only coin dispensed.

*60¢* a. For a sale of 54¢, normal change is 25¢, 10¢, 10¢, 1¢. When tender is a dime and half-dollar, the cent is the only normal coin to be dispensed; but in order to make up the correct 6¢ change a nickel must be added to the dispensed coin. Referring to FIG. 16, the S25¢ and the two dime solenoids S10¢ and S10¢A are open-circuited at the (now open) N.C. contact of $0s_1$ between 104 and 105. The nickel is added, however, since there is a circuit from 30a through the N.C. contact of the coin switch 5¢ to 106, through the (now closed) N.O. contact of $0s_1$ to 114 and through the (now closed) N.O. contact of the coin switch 25¢A to 108.

b. For a sale of 59¢, normal change is 25¢, 10¢, 5¢, 1¢. When tender is any combination of nickel and/or silver coin totalling 60¢, the 25¢ and 10¢ and 5¢ coins must be omitted. The open condition of the N.C. contact of $0s_1$ between 105 and 104 prevents the energization of the S25¢ and S10¢ solenoids, referring to FIG. 16, preventing the payment of the dime and the quarter. Only the cent is dispensed, since the S5¢ solenoid is open-circuited at the N.O. contact of $5s_1$ between 111 and 110, and at the (now open) N.C. contact of $0s_2$ between 111 and 109, and at the (now open) N.C. contact of the coin switch 25¢A between 112 and 108.

*70¢* a. For a sale of 64¢, normal change is 25¢, 10¢, 1¢. When tender is two dimes and a half-dollar, the 25¢ and 10¢ coins must be omitted and a nickel must be added. Referring to FIG. 16, the S25¢ and S10¢ solenoids are open circuited, on depression of range key 0r, at the (now open) N.C. contact of $0s_1$ from 105 to 104, while there is a circuit to the S5¢ solenoid from 30a through the N.C. contact of the coin switch 5¢ to 106, through the (now closed) N.O. contact of $0s_1$, to 114 through the (now closed) N.O. contact of the coin switch 25¢A from 114 to 108. The correct 6¢ change is dispensed.

b. For a sale of 69¢, normal change is 25¢, 5¢, 1¢. When tender is any combination of nickel and/or silver coin totalling 70¢, the 25¢ and nickel coins must be omitted. The S25¢ solenoid is open-circuited at the (now open) N.C. contact of $0s_1$ from 105 to 104 (see FIG. 16). The S5¢ solenoid is open-circuited, even though the 5¢ coin switch is operated, at the N.O. contact $5s_1$ between 111 and 110, also at the (now open) N.C. contact of $0s_2$ from 111 to 109, and at the N.C. contact (now open) of coin switch 25¢A between 112 and 108. The cent is the only coin dispensed.

80¢ a. For a sale of 74¢, normal change is 25¢, 1¢. When tender is a half-dollar and three dimes, the 25¢ coin must be omitted and a nickel added. The S25¢ solenoid is open-circuited, on depression of key 0r, at the N.C. contact of $0s_1$ between 105 and 104. To make up the correct change, a nickel is added since the S5¢ solenoid is energized through a circuit from 30a, through the N.C. contact of the coin switch 5¢ to 106, through the (now closed) N.O. contact of $0s_1$ to 114 and through the (now closed) N.O. contact of coin switch 25¢A to 108.

b. For a sale of 79¢, normal change is 10¢, 10¢, 1¢. When tender is any combination of nickel and/or silver coin totalling 80¢, the two dimes must be omitted. Thus, the S10¢ and S10¢A solenoids are open-circuited by the open condition of the N.C. contact of $0s_1$ between 105 and 104. Consequently the cent is the only coin dispensed.

90¢ a. For a sale of 84¢, normal change is 10¢, 5¢, 1¢. When tender is a half-dollar and four dimes, or nine dimes, the 10¢ normal coin must be omitted. The S10¢ solenoid is open-circuited at the (now open) N.C. contact of $0s_1$ from 105 to 104. Only the 6¢ is dispensed.

b. For a sale of 89¢, normal change is 10¢, 1¢. When tender is any combination of nickel and/or silver coin totalling 90¢, a dime must be omitted. Here, the S10¢ solenoid is open-circuited by the open condition of the N.C. contact of $0s_1$ between 105 and 104. Consequently, the correct 1¢ change is dispensed.

Another embodiment of the present invention, which provides a convenient electrically controlled arrangement for a machine of the nature above described, and including range keys 5r, 25r, 50r, 75r and 0r. Throughout the present application, like reference characters are utilized to describe like parts of the various embodiments.

Figure 18:
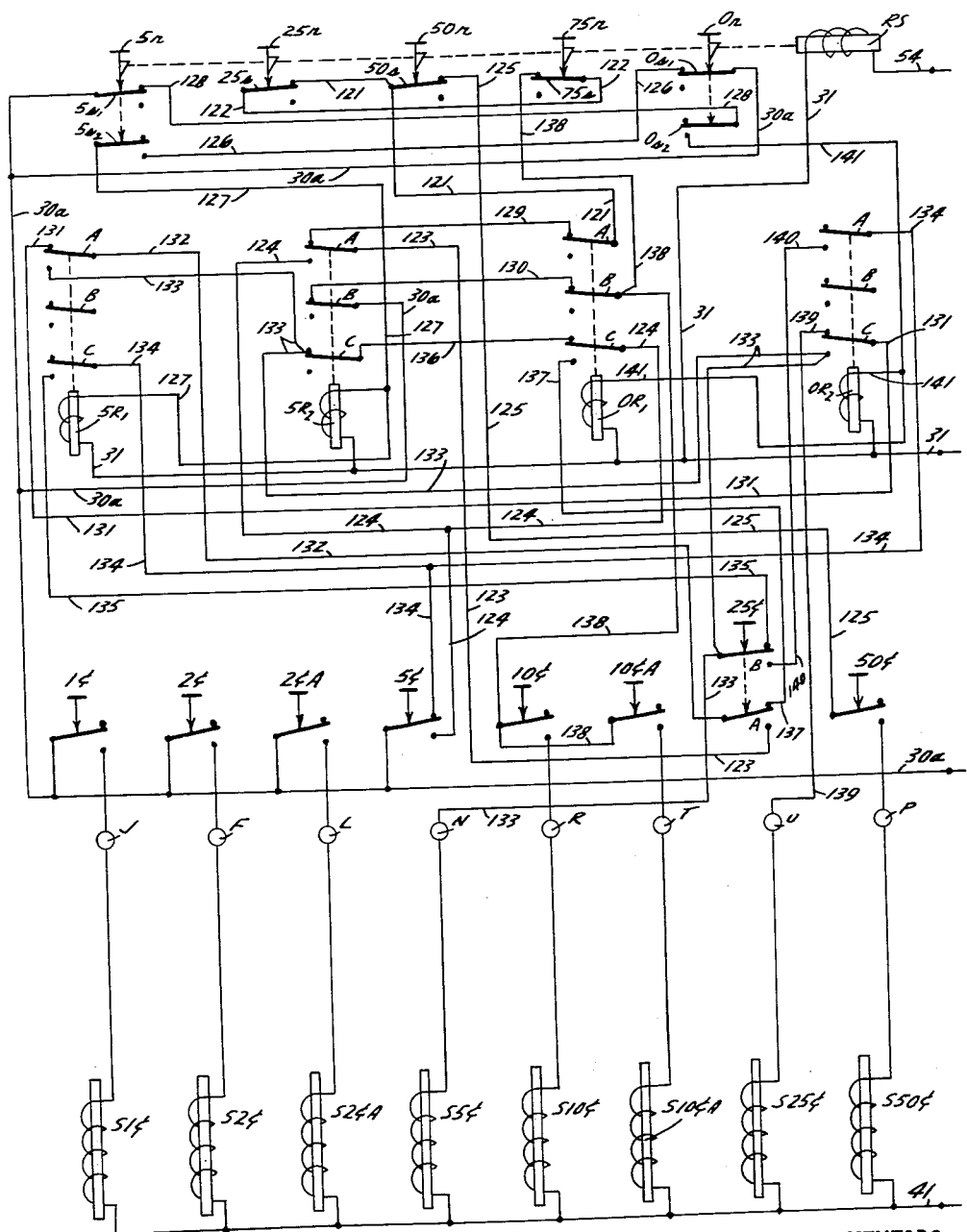
FIG. 18 is the left hand side of a circuit diagram relating to another embodiment of this invention, to be read with the right hand side diagram of FIG. 17, and representing parts of a changer keyboard.

In connection with the description of the present embodiment, attention is directed to the views of FIGS. 12, 13 and 18, the latter figure, as aforestated, to be read in connection with the right hand view of FIG. 17, which view relates to the dispenser circuit, and is applicable to both embodiments.

Referring now to FIGS. 12 and 13, it is to be noted that the present embodiment utilizes a number of substantially identical components as in the first described embodiment, each being mounted on a mounting plate 80 at the front end of the keyboard plates. On plate 80 are mounted realys $5R_1$, $5R_2$, $0R_1$, $0R_2$, seven single pole, double throw, micro switches $5s_1$, $5s_2$, 25s, 50s, 75s, $0s_1$ and $0s_2$, and the five "range" keys 5r, 25r, 50r, 75r and 0r, arranged to operate the respective micro switches. The range keys and other operating components are mounted as previously described in connection with the embodiment of FIGS. 8 and 9.

When a purchase amounts to 21¢ or any other figure less than 25¢, and a quarter is tendered, the 25r key should be depressed. Then, for a 24¢ sale the keyboard key #24 should be depressed and the change dispensed will be one cent from the "A" channel of the coin tray T. Normal change would be: one half-dollar, one quarter, and one cent. Depression of the 25r key prevents the half-dollar and the quarter from being dispensed by preventing the energization of the finger positioning solenoids S25¢ and S50¢. By inspection of FIG. 18, it can be seen that there is no circuit between S50¢ and conductor 30a, since the contact 25s is open between conductors 121 and 122, and relay contact $5R_2A$ is open between conductors 123 and 124 and relay N.O. contacts $5R_1A$ and $0R_2c$ are open. By the same token, it can be seen that there is no circuit between S25¢ and conductor 30a, since S25¢ and S50¢ solenoids are effectively connected in parallel. At any time when the machine is operated using a prior depression of any of the five range keys, upon completion of payment of a coin, the closure of the N.O. contact of switch DX will provide current flow from conductor 30a through switch MS and along conductor 42, through switch DX to its N.O. contact terminal and along conductor 54 to release solenoid RS, energizing it to release the particular key having been latched in, and putting the machine in position to be used for a subsequent operation.

When a purchase amounts to 49¢, and a half-dollar is tendered, the 50r key is the one that should be depressed first. Normal change would be a half-dollar coin and a cent; but by inspection of FIG. 18 it can be seen that there is no circuit between S50¢ and wire 30a since switch 50s is open from 121 to 125, and only the cent is dispensed. As pointed out in the preceding paragraph, upon the completion of payment the machine is returned to its original position.

When a purchase is for 74¢, and a quarter and a half-dollar is the tendered amount, the 75r key should be priorily depressed. Normal change would be one cent and a quarter; but, referring to FIG. 18 only the cent will be dispensed since there is no circuit between wire 30a and S25¢ as noted previously in connection with the quarter tender.

Now then, let us consider the conditions prevailing when the tendered amount is a nickel, or any combination of nickel and silver coin whose value is a figure ending in 5 (5¢, 15¢, 35¢, 45¢, 55¢, 65¢, 85¢ or 95¢), except 25¢ or 75¢, and for which the proper change would never exceed 9¢ (a nickel and four cents). For our discussion, we will consider only those transactions for which the proper change would be either 6¢ or 1¢—transactions involving payment of change that would include more than one cent would entail logic similarly obvious. First of all, the only one of the five range keys used will be the 5r key and this key is always depressed before scheduling the machine by depressing the proper key K. At any time that the 5r key is depressed, it can be seen from FIG. 18 that relays $5R_1$ and $5R_2$ are energized and consequently the relay contacts $5R_{1A}$, $5R_{1B}$ and $5R_{1C}$ as well as $5R_{2A}$, $5R_{2B}$, and $5R_{2C}$ are operated, and remain so as long as key 5r remains operated and latched. The completed circuit from key 5r to the coil of relays $5R_1$ and $5R_2$ runs from $5s_2$, conductor 126, N.C. contact $0s_1$, to conductor 30a, and from $5s_2$ through 127, to the respective coils of relays $5R_1$ and $5R_2$. Then too, neither the $0R_1$ nor the $0R_2$ relay can be energized, since the $5s_1$ contact is open from 30a to 128. In all tender categories mentioned below, reference should be made to FIG. 18 regardless of whether or not such reference is specifically mentioned in each category. We will now traverse the logic of the machine's function involved for the different tenders referred to above, to wit:

5¢

For a 4¢ sale the normal change is 50¢, 25¢, 10¢, 10¢, 1¢, so when the tender is a nickel, the coins other than a cent must be eliminated. Referring to FIG 18, it can be seen that there is no circuit between wire 30a and S50¢ since relay contact $5R_{2A}$ is open from 129 to 123, as also is relay contact $5R_{2B}$ from 130 to 30a. Similarly, there is no circuit between wire 30a and the two dime solenoids S10¢ and S10¢A, since relay contact 5R₂ʙ is open. Also no circuit exists between wire 30a and S25¢, since relay contacts 5R₁ₐ from 131 to 132 and 0R₂c from 133 to 131 are open. Consequently, all that is dispensed is one cent.

15¢

For a 14¢ sale, the normal change is 50¢, 25¢, 10¢, 1¢ and the 50¢, 25¢, 10¢ coins must be eliminated. On depression of range key 5r, prior to depression of K key #14, there will be no circuit between wire 30a and any of the three solenoids S50¢, S25¢ and S10¢ for the same reason noted for the 5¢ tender, and only the one-cent coin is dispensed.

35¢ a. For a 29¢ sale, the normal change is 50¢, 10¢, 10¢, 1¢, and the half-dollar and the dimes must be omitted when working with tender of a quarter and a dime. The circuit will be broken between wire 30a and the three solenoids S50¢, S10¢ and S10¢A by the same token observed for 5¢ tender, and the only coin from normal change dispensed is the cent. However, to make the correct change we must add a nickel coin to be dispensed; so we see that a circuit is established between wire 30a and the solenoid S5¢, through N.C. contact of coin switch 5¢ to 134 and through relay contact 5R₁c (N.O.—now closed) to 135 and through N.C. contact of coin switch 25¢B to wire 133 and solenoid S5¢, and the nickel will thereby be dispensed.

b. For a 34¢ sale, when tender is any combination of nickel and/or silver coin totalling 35¢ the normal change is 50¢, 10¢, 5¢, 1¢, and all coins except the cent must be omitted. Here, the circuit is broken to the S50¢ and the S10¢ solenoids (as described for 5¢ tender); and also no circuit exists between wire 30a and the S5¢ solenoid since, even though the coin switch 5¢ is operated, the relay N.C. contact 5R₂c is open, as is also the relay N.O. contact 0R₁c and the N.O. contact of coin switch 25¢A. Therefore only the cent is dispensed.

45¢ a. For a 39¢ sale, the normal change is 50¢, 10¢, 1¢, and the 50¢ and 10¢ coins must be omitted when working with a tender of a quarter and two dimes. Here, we see that we have no circuit between wire 30a and the two solenoids S50¢ and S10¢ since the relay contact 5R₂ₐ is open from 129 to 123, and relay N.C. contact 5R₂ʙ is open from 130 to 30a, leaving only the 1¢ coin to be dispensed. But for a 39¢ sale from 45¢ tender, a nickel must be dispensed along with the 1¢ coin: so a circuit is established from wire 30a through the N.C. contact of coin switch 5¢ along 134 through relay contact 5R₁c (N.O.—now closed) to 135 and through N.C. contact of coin switch 25¢B to 133 to S5¢.

b. For sale of 44¢, the normal change is 50¢, 5¢, 1¢ and when tender is any combination of silver and/or nickel coin totalling 45¢, the nickel and 50¢ must be omitted from the dispensed change. Here the circuit to the S50¢ solenoid is interrupted, since relay contact 5R₂ₐ is open from 129 to 123 and contact 5R₂ʙ is open from 30a to 130. Also, even though the coin switch 5¢ is operated, we have no circuit to S5¢ solenoid since relay N.C. contact 5R₂c is open. Consequently, only the cent is dispensed.

55¢ a. For a sale of 49¢, normal change is 50¢, 1¢. When the tender is three dimes and a quarter, the 50¢ must be omitted and a nickel must be added. In this instance the circuit to the S50¢ solenoid is broken by the relay N.C. contacts 5R₂ₐ from 129 to 123 and 5R₂ʙ from 30a to 130 also being open. Also, the nickel is dispensed since we have a circuit from wire 30a through the N.C. contact of coin switch 5¢ to 134 and through relay N.O. contact 5R₁c (now closed) to 135 and through coin switch N.C. contact 25¢B to 133 to the S5¢ solenoid.

b. For a sale of 54¢, normal change is 25¢, 10¢, 10¢, 1¢. When tender is any combination of silver and/or nickel coin totalling 55¢, the normal change 25¢ and two 10¢ coins must be omitted. Here, the circuit to the S25¢ solenoid is broken at relay N.O. contact 0R₂c from 133 to 131, and at relay contact (N.C.—now open) 5R₁ₐ from 132 to 131. Also the circuit to the two dimes solenoids S10¢ and S10¢A is broken at relay contact (N.C.—now open) 5R₂ₐ from 129 to 123, and at relay contact (N.C.—now open) 5R₂ʙ from 30a to 130. Thus, only the cent coin will be dispensed.

65¢ a. For a sale of 59¢, normal change is 25¢, 10¢, 5¢, 1¢. When working with a tender of a quarter and four dimes, the normal change 25¢ and 10¢ must be omitted. The circuit to the S25¢ solenoid is broken by the N.O. relay contact 0R₂c from 133 to 131 and by the (N.C.—now open) relay contact 5R₁ₐ from 132 to 131. Also, the circuit to the S10¢ solenoid is open by virtue of the (N.C.—now open) relay contacts 5R₂ₐ from 129 to 123 and 5R₂ʙ from 30a to 130 also being open. Also, the S5¢ solenoid has a closed circuit from wire 30a through the (N.O.—now closed) contact of coin switch 5¢ to 124 through (N.O.—now closed) relay contact 5R₂ₐ to 123 through the (N.O.—now closed) contact of coin switch 25¢A to 132, thence through relay contact 5R₁ₐ (N.O.—now closed) to 133, and the 5¢ and 1¢ coins are dispensed.

b. For a sale of 64¢, normal change is 25¢, 10¢, 1¢. When the tender is any combination of nickel and/or silver coin totalling 65¢, the 25¢ and 10¢ coins must be omitted. The circuit to S10¢ solenoid is open just as in the case of the 59¢ sale, above described, and the same applies to the S25¢ solenoid. Therefore, only the 1¢ coin is dispensed.

85¢ a. For a sale of 79¢, normal change is 10¢, 10¢, 1¢. When the tender is a quarter and six dimes, the normal change two dimes must be omitted and a 5¢ coin added. Upon depression of the range key 5r, prior to depression of K key 79, we have the circuit to the dime solenoids S10¢ and S10¢A broken by the N.C. (now open) relay contact 5R₂ₐ from 129 to 123, and by the N.C. relay contact 5R₂ʙ open from 30a to 130. Also, the S5¢ solenoid is energized through the circuit from 30a, through N.C. contact of coin switch 5¢ to 134 through N.O. (now closed) relay contact 5R₁c to 135, through N.C. contact of coin switch 25¢B to 133. Consequently, the correct change of one 5¢ and one 1¢ coin is dispensed.

b. For a sale of 84¢, normal change is 10¢, 5¢, 1¢. When tender is any combination of nickel and silver coin totalling 85¢, the 10¢ and 5¢ coins must be omitted. Here, no circuit exists to the S10¢ solenoid, as disclosed in connection with the sale of 79¢. Also, the S5¢ solenoid circuit is broken by the now open N.C. relay contact 5R₂c from 136 to 133 and by the N.O. contact of coin switch 25¢A from 123 to 132, even though the 5¢ coin switch is operated, and by the N.O. relay contact 0R₁c from 124 to 137. Therefore, only the cent is dispensed.

95¢ a. For a sale of 89¢, normal change is 10¢, 1¢. When tender is seven dimes and a quarter, the 10¢ coin must be omitted and a 5¢ coin added. Here, the S10¢ solenoid has a broken circuit for the same reasons as described above in connection with the 79¢ sale, and the S5¢ solenoid has a circuit from wire 30a through coin switch 5¢, etc., so that the correct 6¢ change will be dispensed.

b. For a sale of 94¢, normal change is 5¢, 1¢. When tender is any combination of nickel and/or silver coin totalling 95¢, the 5¢ coin must be omitted. Here, the S5¢ solenoid circuit will be interrupted from wire 30a since, even though the coin switch 5¢ is operated, there are open circuit points at the N.O. contact of coin switch 25¢A from 123 to 132, at the N.O. relay contact $OR_{1C}$ from 124 to 137, and at the N.C. (now open) relay contact $5R_{2C}$ from 136 to 133. Consequently, only the cent is dispensed.

Next, consider the conditions in effect when the tendered amount is a dime or any combination of nickel and silver coin whose value is a figure ending with a zero (0) excepting 50¢ (such as 10¢, 20¢, 30¢, 40¢, 60¢, 70¢, 80¢ and 90¢) and for which the proper change would never exceed 9¢. For our discussion, we will consider only those transactions for which the correct change would be either 6¢ or 1¢, as consideration of transactions involving payment of change involving more than one cent would not more fully further this presentation to a profitable degree. First of all, the only one of the five "range" keys used will be the 0r key, and this key is always depressed before scheduling the machine by depressing the numbered key corresponding to the amount of the purchase. At any time that the 0r key is depressed, it can be seen from FIG. 18 that relays $OR_1$ and $OR_2$ are energized and consequently their contacts ($OR_{1A}$, $OR_{1B}$, $OR_{1C}$, $OR_{2A}$, $OR_{2B}$ and $OR_{2C}$) are operated and remain so as long as key 0r remains operated and latched. At the same time, neither the $5R_1$ relay nor the $5R_2$ relay can be energized, since the N.C. $0s_1$ contact is open from 30a to 126. The circuit is completed, however, upon depression of the 0r key, to the respective coils of relays $OR_1$ and $OR_2$ from now closed switch contacts $0s_2$, conductors 128 and 30a wire 141, coils $OR_1$ and $OR_2$ to wire 31. We will now traverse the logic of the machine's function involved, for the different tenders referred to in the first sentence of this paragraph, to wit:

*10¢* a. For a sale of 4¢, normal change is 50¢, 25¢, 10¢, 10¢, 1¢. When the tender is one dime, the normal change coins must be omitted, with the exception of the cent, and a nickel must be added. Thus on depression of the 0r range key, and subsequent depression of the K key #4, the S50¢ and S10¢ and S10¢A solenoids have no circuit to wire 30a since relay N.C. contact $OR_{1A}$ from 121 to 129 and relay N.C. contact $OR_{1B}$ from 130 to 138 are now open. Also, the S25¢ solenoid has no circuit, since relay N.C. contact $OR_{2C}$ from 131 to 139 is open. The S5¢ solenoid has a circuit from wire 30a through the N.C. contact of coin switch 5¢ to 134 through relay N.O. (now closed) contact $OR_{2A}$ to 140 through coin switch N.O. (now closed) contact 25¢B to conductor 133; therefore the correct 6¢ will be dispensed.

b. For a 9¢ sale, the normal change is 50¢, 25¢, 10¢, 5¢ and 1¢. When tender is one dime or two nickels, the cent must be the only coin dispensed. The S50¢, S25¢ and S10¢ solenoids, in this case, are open-circuited at the same points described in connection with the 4¢ sale, while the S5¢ solenoid is open-circuited (even though the coin switch 5¢ is operated) by N.O. relay contact $5R_{2A}$ from 124 to 123, by coin switch N.C. (now open) contact 25¢A from 137 to 132, and by relay N.C. contact (now open) $OR_{1C}$ from 124 to 136. Thus, the cent is the only coin dispensed.

*20¢* a. For a sale of 14¢, normal change is 50¢, 25¢, 10¢ and 1¢. When tender is two dimes, the cent is the only normal coin to be dispensed, with a nickel added. Referring to FIG. 18, the S50¢, S25¢ and S10¢ solenoids are open-circuited, on depression of key 0r by relay N.C. (now open) contacts $OR_{1B}$ from 130 to 138, contacts $OR_{1A}$ from 121 to 129, and contacts $OR_{2C}$ from 131 to 139. The S5¢ solenoid has a circuit from wire 30a through coin switch N.C. contact 5¢ to 134, through relay N.O. contact (now closed) $OR_{2A}$ to 140 through coin switch 25¢B N.O. contact (now closed) to 133. Consequently, one nickel and one cent are dispensed.

b. For a sale of 19¢, normal change is 50¢, 25¢, 5¢ and 1¢. When tender is any combination of silver or nickel and silver coin totalling 20¢, all coins but the cent must be omitted. Thus, the S50¢ solenoid is open-circuited by relay N.C. (now open) contacts $OR_{1A}$ from 121 to 129 and $OR_{1B}$ from 130 to 138. Also, the S25¢ solenoid is open-circuited by the N.C. relay contact (now open) $OR_{2C}$ from 131 to 139. Even though the coin switch 5¢ is operated, the S5¢ solenoid is open-circuited at relay N.O. contact $5R_{2A}$ from 124 to 123, at coin switch 25¢A N.C. (now open) contact from 137 to 132, and at relay N.C. (now open) contact $OR_{1C}$ from 136 to 124, and the cent is the only coin dispensed.

*30¢* a. For a sale of 24¢, normal change is 50¢, 25¢ and 1¢. When the tender is three dimes, the cent is the only normal coin to be dispensed, with a nickel added. Here, the S50¢ solenoid is open-circuited at relay N.C. (now open) contacts $OR_{1A}$ from 121 to 129 and $OR_{1B}$ from 130 to 138. Also, the S5¢ solenoid has a circuit from wire 30a through coin switch 5¢ N.C. contact to 134 through relay N.O. (now closed) contact $OR_{2A}$ to 140 and through coin switch N.O. contact (now closed) 25¢B to 133. At the same time, the S25¢ solenoid is open-circuited at relay N.C. (now open) contact $OR_{2C}$ from 131 to 139. Then the proper 6¢ change is dispensed.

b. For a sale of 29¢, normal change is 50¢, 10¢, 10¢ and 1¢. When the tender is any combination of silver, or nickel and silver, coin totalling 30¢, the cent is again the only normal coin to be dispensed. Thus, the S50¢, S10¢ and S10¢A solenoids are open-circuited at the relay N.C. (now open) contacts $OR_{1A}$ from 121 to 129 and $OR_{1B}$ from 130 to 138. Consequently, only the cent remains to be dispensed.

*40¢* a. For a sale of 34¢, normal change is 50¢, 10¢, 5¢ and 1¢. When tender is four dimes, the half-dollar and dime must be omitted. Upon depression of range key 0r, the S50¢ and S10¢ solenoids are open-circuited by relay N.C. (now open) contacts $OR_{1A}$ from 121 to 129 and $OR_{1B}$ from 130 to 138. Then the correct change is dispensed, since the S5¢ solenoid has a circuit from wire 30a through the coin switch 5¢ N.O. (now closed) contact to 124 through relay N.O. (now closed) contact $OR_{1C}$ to 137 through coin switch N.C. contact 25¢A to 132 through relay N.C. contact $5R_{1A}$ to 131 through relay N.O. (now closed) contact $OR_{2C}$ to 133.

b. For a sale of 39¢, normal change is 50¢, 10¢ and 1¢. When tender is any combination of silver and/or nickel coin totalling 40¢, the 50¢ and 10¢ coins must be omitted. Here, the S50¢ and S10¢ solenoids are open-circuited at relay N.C. (now open) contacts $OR_{1A}$ from 121 to 129 and $OR_{1B}$ from 130 to 138, and only the cent is dispensed.

*60¢* a. For a sale of 54¢ normal change is 25¢, 10¢, 10¢ and 1¢. When tender is a dime and half-dollar, the cent is the only normal coin dispensed; but a nickel must be added. Here, the S25¢ solenoid is open-circuited at relay contact N.C. (now open) $OR_{2C}$ from 131 to 139, and the S10¢ and S10¢A solenoids are open-circuited at relay N.C. (now open) contacts $OR_{1A}$ from 121 to 129 and $OR_{1B}$ from 130 to 138, and the cent is the only normal coin dispensed. Then, even though the coin switch 5¢ is not operated, the S5¢ solenoid has a circuit from 30a through the 5¢ coin switch N.C. contact to 134 through relay N.O. (now closed) contact $OR_{2A}$ to 140 through coin switch N.O. (now closed) contact 25¢B to 133. The correct 6¢ change will then be dispensed.

b. For a sale of 59¢, normal change is 25¢, 10¢, 5¢ and 1¢. When tender is any combination of nickel and/or silver totalling 60¢, the 25¢ and 10¢ and 5¢ coins must be omitted. In this case, the S25¢ and S10¢ solenoids are open-circuited at the same points indicated in the discussion with reference to the 54¢ sale; and only the cent is dispensed, since the S5¢ solenoid is open-circuited at coin switch 25¢A contact (N.C.—now open) from 137 to 132, and at relay N.O. contact 5R$_{2A}$ from 124 to 123 and at relay N.C. (now open) contact 0R$_{1C}$ from 124 to 136.

70¢ a. For a sale of 64¢, normal change is 25¢, 10¢ and 1¢. When tender is two dimes and a half-dollar, the 25¢ and 10¢ coins must be omitted and a nickel added. Referring to FIG. 18, the S25¢ and S10¢ solenoids are open-circuited at the same points noted in the discussion with reference to the 54¢ sale, which reference discussion also covers the addition of the nickel, and the correct change of 6¢ is dispensed.

b. For a sale of 69¢, normal change is 25¢, 5¢ and 1¢. When tender is any combination of nickel and/or silver coin totalling 70¢, the 25¢ and 5¢ coins must be omitted. Here, referring to FIG. 18, the S25¢ solenoid is open-circuited at relay N. C. (now open) contact 0R$_{2C}$ from 131 to 139 and the S5¢ solenoid is open-circuited by the N.O. relay contact 5R$_{2A}$ from 124 to 123 and by the relay N.C. (now open) contact 0R$_{1C}$ from 124 to 136 and by coin switch N.C. (now open) contact 25¢A from 137 to 132. The cent is the only coin dispensed.

80¢ a. For a sale of 74¢, normal change is 25¢, 1¢. When tender is a half-dollar and three dimes, the 25¢ coin must be omitted and a nickel added. With reference to FIG. 18, the S25¢ solenoid is open-circuited at relay N.C. (now open) contact 0R$_{2C}$ from 131 to 139, while the S5¢ solenoid has a circuit from wire 30a through 5¢ coin switch N.C. contact to 134 through relay N.O. (now closed) contact 0R$_{2A}$ to 140 through coin switch N.O. (now closed) contact 25¢B to 133, and the correct change is dispensed.

b. For a sale of 79¢, normal change is 10¢, 10¢ and 1¢. When tender is any combination of nickel and/or silver coin totalling 80¢, the two dimes must be omitted. Referring to FIG. 18, the S10¢ and S10¢A solenoids are open-circuited by relay contacts N.C. (now open) 0R$_{1A}$ from 121 to 129 and 0R$_{1B}$ from 130 to 138, and the correct 1¢ change is dispensed.

90¢ a. For a sale of 84¢, normal change is 10¢, 5¢ and 1¢. When tender is a half-dollar and four dimes, or nine dimes, the 10¢ coin must be omitted. Here, the S10¢ solenoid is open-circuited by relay N.C. (now open) contacts 0R$_{1A}$ from 121 to 129 and 0R$_{1B}$ from 130 to 138. Thus, the correct change of 6¢ will be dispensed.

b. For a sale of 89¢, normal change is 10¢, and 1¢. When tender is any combination of nickel and/or silver coin totalling 90¢, the dime must be omitted. Referring to FIG. 18, the S10¢ solenoid is open-circuited by the same means revealed in the preceding paragraph, and only the cent is dispensed.

It will be apparent, that in both of the described embodiments, the circuitry permits an operator to depress either the 5r or 0r range keys in all cases for tender less than one dollar, except in the situations where a quarter or a half-dollar or a quarter and half-dollar are tendered, either the range keys 25r, 50r or 75r may be respectively depressed, to effect dispensing of proper change. The 25r, 50r and 75r keys are provided as added feature to expedite the making of change for the respective tendered amounts, as these are relatively common transactions.

We desire it to be understood that the present invention is not to be limited to any particular form or arrangement of parts, except in so far as such limitations are included in the claims.

We claim:

1. In an electrically controlled coin changing machine including a plurality of coin dispensing channels for different denominations of coins; a coin ejector mechanism for each of said coin channels, selectively operable electrically controlled means for rendering each ejector mechanism operable to dispense a coin, said means including a plurality of control switches; a keyboard having a plurality of change keys operatively associated with and arranged for selectively actuating said control switches to thereby effect a return of change on a dollar basis; the combination with range keys including a "zero" and a "five" rank key operable to effect a return of change on less-than-a-dollar basis from said coin dispensing channels; switch contacts respectively controlled by said range keys and being arranged to selectively interrupt the electric circuit to the operating means controlling the ejector mechanisms for channels dispensing coins having denominations of a dime, a quarter and a half-dollar, and special switch means respectively controlled by said "zero" and "five" range keys and arranged, upon depression of a respective range key, to control the circuit to the ejector-mechanism-control-means for the five-cent-denomination-channel and to respectively cooperate with the switches controlled by the said change keys to effect the addition or subtraction of a nickel to satisfy the change requirements of any particular change situation.

2. In an electrically controlled coin changing machine including a plurality of coin dispensing channels for different denominations of coins; a coin ejector mechanism for each of said coin channels, selectively operable electrically controlled means for rendering each ejector mechanism operable to dispense a coin, said means comprising a control switch and an operating rocker for each control switch; a keyboard having a plurality of change keys numbered from 1 to 99 arranged for selectively operating said rockers for actuating respective control switches to thereby effect a return of change on a dollar basis; the combination with a plurality of range keys including a "zero" and a "five" range key operable to effect a return of change on less-than-a-dollar basis from said coin dispensing channels; a plurality of switch contacts respectively controlled by said range keys and being arranged to selectively interrupt the electric circuit to the operating means controlling the ejector mechanisms for channels dispensing coins having denominations of a dime, a quarter and a half-dollar, and special switch means respectively controlled by said "zero" and "five" range keys and arranged, upon depression of a respective range key, to control the circuit to the ejector-mechanism-control-means for the five-cent-denomination-channel and to respectively cooperate with the switches controlled by the said change keys to effect the addition and subtraction of a nickel to satisfy the change requirements of any particular change situation.

3. In an electrically controlled coin changing machine including a plurality of coin dispensing channels for different denominations of coins; a coin ejector mechanism for each of said coin channels, selectively operable electrically controlled means for rendering each ejector mechanism operable to dispense a coin, said means comprising a control switch and an operating rocker for each control switch; a keyboard having a plurality of change keys numbered from 1 to 99 arranged for selectively operating said rockers for actuating respective control switches to thereby effect a return of change on a dollar basis; the combination with a plurality of range keys including a "zero" and a "five" range key operable to effect a return of change on less-than-a-dollar basis from said coin dispensing channels; a plurality of switch contacts respectively controlled by said range keys and being arranged to selectively interrupt the electric circuit to the operating means controlling the ejector mechanisms for channels dispensing coins having denominations of a dime, a quarter and a half-dollar, relays controlled by said "five" and "zero" range keys, said relays each including a group of contacts arranged to control the circuit to the ejector-mechanism-control-means for the five-cent-denomination-channel and to respectively cooperate with the switches controlled by the said change keys to effect the addition and subtraction of a nickel to satisfy the change requirements of any particular change situation.

4. In an electrically controlled coin changing machine including a plurality of coin dispensing channels for different denominations of coins; a coin ejector mechanism for each of said coin channels, selectively operable electrically controlled means for rendering each ejector mechanism operable to dispense a coin, said means comprising a control switch and an operating rocker for each control switch; a keyboard having a plurality of change keys numbered from 1 to 99 arranged for selectively operating said rockers for actuating respective control switches to thereby effect a return of change on a dollar basis; the combination with a plurality of range keys numbered 25, 50, 75, zero and five and each being operable to effect a return of change on less-than-a-dollar basis from said coin dispensing channels; switch contacts respectively controlled by each of said range keys and being arranged to selectively interrupt the electric circuit to the operating means controlling the ejector mechanisms for channels dispensing coins having denominations of a dime, a quarter and a half-dollar, and special switch means respectively controlled by said "zero" and "five" range keys and arranged, upon depression of a respective range key, to control the circuit to the ejector-mechanism-control-means for the five-cent-denomination-channel and to respectively cooperate with the switches controlled by the said change keys to effect the addition and subtraction of a nickel to satisfy the change requirements of any particular change situation.

5. In an electrically controlled coin changing machine including a plurality of coin dispensing channels for different denominations of coins; a coin ejector mechanism for each of said coin channels, selectively operable electrically controlled means for rendering each ejector mechanism operable to dispense a coin, said means including a control switch; a keyboard having a plurality of change keys operatively associated with and arranged for selectively actuating said control switches to thereby effect a return of change on a dollar basis; the combination with a plurality of depressible range keys operable to effect a return of change on less-than-a-dollar basis from said coin dispensing channels; releasable latch means for said range keys operatively associated with each of said keys to maintain said key in depressed position, and latch release means cooperable with said latch means and with said electrically controlled means to release said latch means for said depressed key upon completion of a coin dispensing operation.

6. In an electrically controlled coin changing machine including a plurality of coin dispensing channels for different denominations of coins; a coin ejector mechanism for each of said coin channels, selectively operable electrically controlled means for rendering each ejector mechanism operable to dispense a coin, said means including a control switch; a keyboard having a plurality of change keys operatively associated with and arranged for selectively actuating said control switches to thereby effect a return of change on a dollar basis; the combination with a plurality of depressible range keys operable to effect a return of change on less-than-a-dollar basis from said coin dispensing channels; said range keys being arranged in spaced alignment relative to a common plane and each including an elongated switch operating stem, guide means for said stem, biasing means normally urging said key in a direction opposed to depression thereof, said stem including a laterally extending projection having a latching point and a cam surface, a pivotally supported latch bar arranged to be independently rotated on its pivot by each of the cam surfaces of said key stem projections on depression of a respective key and bearing means for said latch bar normally urging said bar towards latching engagement with the said latching point, and latch bar release means associated with said electrically controlled means and arranged for release of said latch bar from said latch point upon the completion of a coin dispensing operation.

7. In a coin dispensing machine including a plurality of coin channels; a coin ejector mechanism for each channel; electrically controlled means for selectively operating said coin ejector mechanisms including a control switch for each ejector mechanism, switch actuating means for each switch, and a keyboard having a plurality of keys arranged to selectively control said switch actuating means; the combination with a releasable locking member for maintaining said switch actuating means in switch operating position, an electrically operated actuator for moving said locking member into its locking position, relay means arranged to control an electric circuit to said actuator including a relay and a switch arranged to control the operation of said relay responsive to the operation of said coin ejector mechanism electrically controlled means, whereby normally closed contacts of said relay will be opened on operation of said electrically controlled means, and means in said control circuit arranged to maintain said relay energized to hold its normally closed contacts in open position, said means being associated with said ejector mechanism control means and arranged to interrupt said relay circuit on completion of the dispensing operation.

8. In a coin dispensing machine including a plurality of coin channels; a coin ejector mechanism for each channel; electrically controlled means for selectively operating said coin ejector mechanisms including a control switch for each ejector mechanism; an operating rocker for each switch; and a keyboard having a plurality of keys numbered from 1 to 99, said keys being arranged to selectively operate said rockers; the combination with a releasable locking member for locking a key selected rocker into operating position, biasing means normally urging said locking member towards its non-locking position, an electrically operated actuator for moving said locking member into its locking position, a control circuit for said actuator including a rocker operated switch for energizing said actuator, a first relay including normally closed contacts in series connection with said rocker operated switch, a second switch arranged to control the operation of said first relay responsive to the operation of said coin ejector mechanism electrically controlled means, whereby said normally closed contacts will be opened on operation of said electrically controlled means, and a second relay in said control circuit arranged to be energized in parallel electrical connection with said first relay, said second relay including normally closed contacts arranged in series electrical connection with said ejector mechanism control means and the said ejector mechanism control means and being arranged to insure the de-energization of said ejector mechanism control means at a preselected point in its operational cycle; said second relay coil and said first relay coil arranged to be disconnected electrically from said rocker-operated switch for energizing said actuator, on completion of the dispensing operation.

References Cited in the file of this patent

UNITED STATES PATENTS 2,675,006     Buchholz _____ Apr. 13, 1954

UNITED STATES PATENT OFFICE
CERTIFICATE OF CORRECTION

Patent No. 3,023,755                      March 6, 1962

Arnold R. Buchholz et al.

It is hereby certified that error appears in the above numbered patent requiring correction and that the said Letters Patent should read as corrected below.

Column 6, line 18, before "moves" strike out "and"; column 11, line 29, for "depresesd" read -- depressed --; column 12, line 30, for "center" read -- cent --; column 24, line 15, for "rank" read -- range --.

Signed and sealed this 26th day of June 1962.

(SEAL)
Attest:

ERNEST W. SWIDER
Attesting Officer

DAVID L. LADD
Commissioner of Patents